United States Patent
Ikeda

(10) Patent No.: US 11,836,300 B2
(45) Date of Patent: Dec. 5, 2023

(54) INFORMATION PROCESSING APPARATUS AND INFORMATION PROCESSING METHOD

(71) Applicant: SONY GROUP CORPORATION, Tokyo (JP)

(72) Inventor: Takuya Ikeda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/757,952

(22) PCT Filed: Dec. 23, 2020

(86) PCT No.: PCT/JP2020/048295
§ 371 (c)(1),
(2) Date: Jun. 24, 2022

(87) PCT Pub. No.: WO2021/140921
PCT Pub. Date: Jul. 15, 2021

(65) Prior Publication Data
US 2023/0022806 A1 Jan. 26, 2023

(30) Foreign Application Priority Data
Jan. 9, 2020 (JP) .................................. 2020-001790

(51) Int. Cl.
*G06F 3/03* (2006.01)
*G06F 3/0354* (2013.01)

(52) U.S. Cl.
CPC ........ *G06F 3/0321* (2013.01); *G06F 3/03545* (2013.01)

(58) Field of Classification Search
CPC ............................ G06F 3/0321; G06F 3/03545
See application file for complete search history.

(56) References Cited

U.S. PATENT DOCUMENTS

2014/0285475 A1   9/2014 Ogata et al.
2018/0113519 A1*  4/2018 Yamamoto .......... G06F 3/04166
(Continued)

FOREIGN PATENT DOCUMENTS

CN    103946668 A    7/2014
JP    2010-152717 A  7/2010
(Continued)

OTHER PUBLICATIONS

International Search Report and Written Opinion of PCT Application No. PCT/JP2020/048295, dated Apr. 6, 2021, 10 pages of ISRWO.

*Primary Examiner* — Towfiq Elahi
(74) *Attorney, Agent, or Firm* — CHIP LAW GROUP

(57) ABSTRACT

Provided is an information processing apparatus, that includes a light emission control unit that turns on IR LEDs (light emission units) included in electronic pens (operation bodies) in which communication with the information processing apparatus is established and blinks the IR LEDs included in the electronic pens at timings different from each other in a case where another electronic pen approaches. Then, a light emission recognition unit detection unit detects a position according to the IR LED included in each of the electronic pens in association with the electronic pen. An input/output control unit (display control unit) displays information associated with the electronic pen at a position corresponding to the IR LED detected by the light emission recognition unit in a case where the electronic pen is in an information input state.

16 Claims, 21 Drawing Sheets

(56) References Cited

U.S. PATENT DOCUMENTS

| | | | | |
|---|---|---|---|---|
| 2018/0217683 A1* | 8/2018 | Kobayashi | ............. | G06F 3/042 |
| 2019/0102021 A1* | 4/2019 | Jang | ..................... | G06F 3/0383 |
| 2019/0235649 A1* | 8/2019 | Oyama | ................ | G06F 3/0383 |

FOREIGN PATENT DOCUMENTS

| | | | | |
|---|---|---|---|---|
| JP | 2011-123580 A | 6/2011 | | |
| JP | 2016-184268 A | 10/2016 | | |
| JP | 2017-157916 A | 9/2017 | | |
| JP | 2018-156466 A | 10/2018 | | |
| WO | WO-2012081473 A1 * | 6/2012 | ......... | G06F 3/03542 |
| WO | 2014/034049 A1 | 3/2014 | | |
| WO | 2018/116462 A1 | 6/2018 | | |
| WO | 2019/130696 A1 | 7/2019 | | |

* cited by examiner

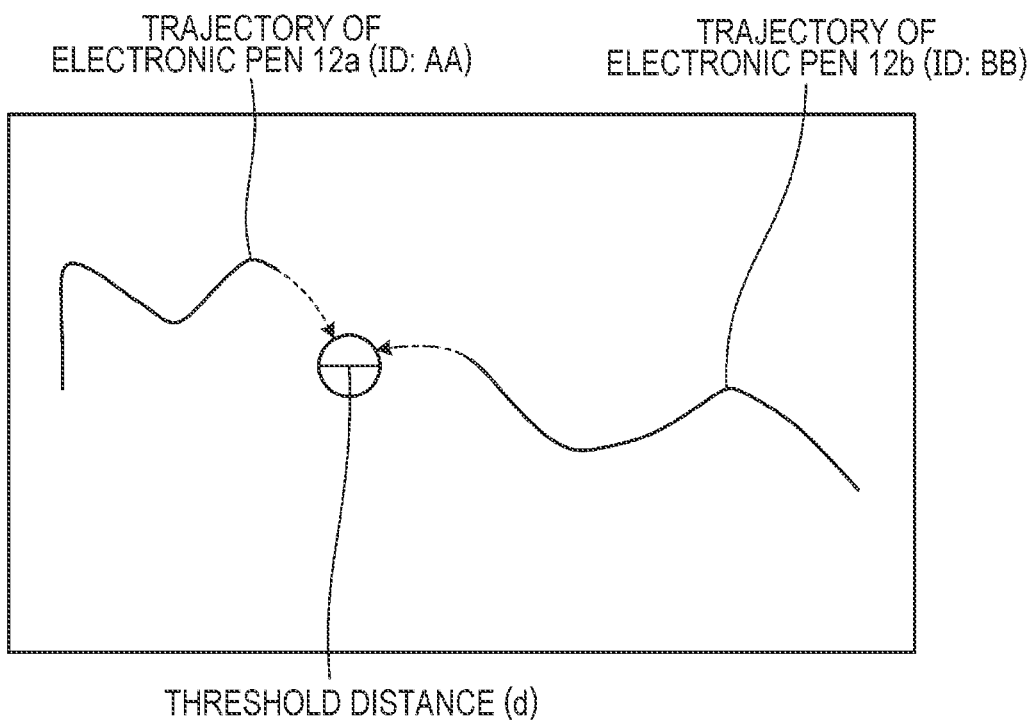

| STATE | STATE OF ELECTRONIC PEN AS CONTROL TARGET | STATE OF ANOTHER ELECTRONIC PEN WITHIN THRESHOLD DISTANCE | IR LED CONTROL COMMAND TO BE TRANSMITTED TO ELECTRONIC PEN AS CONTROL TARGET | IR LED CONTROL COMMAND TO BE TRANSMITTED TO ANOTHER ELECTRONIC PEN |
|---|---|---|---|---|
| (a) | INPUTTING | INPUTTING | BLINK (blink) | BLINK (blink) |
| (b) | INPUTTING | NOT INPUTTING | TURN-ON (on) | TURN-OFF (off) |
| (c) | NOT INPUTTING | INPUTTING | TURN-OFF (off) | TURN-ON (on) |
| (d) | NOT INPUTTING | NOT INPUTTING | BLINK (blink) | BLINK (blink) |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/048295 filed on Dec. 23, 2020, which claims priority benefit of Japanese Patent Application No. JP 2020-001790 filed in the Japan Patent Office on Jan. 9, 2020. Each of the above-referenced applications is hereby incorporated herein by reference in its entirety.

TECHNICAL FIELD

The present disclosure relates to an information processing apparatus, an information processing method, and a program, and more particularly, relates to an information processing apparatus, an information processing method, and a program capable of reliably recognizing a position corresponding to each of electronic pens even in a case where a plurality of electronic pens approaches each other.

BACKGROUND ART

In the related art, an interactive projector for performing writing of a figure or text or a user interface (UI) operation on a display screen using an electronic pen is commercialized. In such a system, generally, an image of light emitted from the electronic pen, mainly infrared light (IR light), is captured by a camera, and a position of the electronic pen is detected by analyzing the captured image (for example, Patent Document 1).

CITATION LIST

Patent Document

Patent Document 1: WO 2019/130696

SUMMARY OF THE INVENTION

Problems to be Solved by the Invention

However, Patent Document 1 has a problem that it is difficult to separate and detect IR light beams emitted from a plurality of electronic pens in a case where the IR light beams approach each other. This is because the camera that captures an image of the IR light beams recognizes the IR light beams approaching each other as a same bright spot.

The present disclosure proposes an information processing apparatus, an information processing method, and a program capable of reliably recognizing a position corresponding to each electronic pen even in a case where a plurality of electronic pens approaches each other.

Solutions to Problems

In order to solve the above problem, according to an aspect of the present disclosure, there is provided an information processing apparatus including: a light emission control unit that turns on light emission units included in operation bodies for which communication with the information processing apparatus is established and blinks the light emission units included in the operation bodies at timings different from each other in a case where another operation body approaches; a detection unit that detects a position according to the light emission unit included in each of the operation bodies in association with the operation body; and a display control unit that displays information associated with the operation body at a position corresponding to the light emission unit detected by the detection unit in a case where the operation body is in an information input state.

BRIEF DESCRIPTION OF DRAWINGS

FIG. 8 is a diagram for explaining an outline of ID exchange determination processing based on a distance between bright spots.

FIG. 9 is a diagram for explaining an IR LED control command issued by a light emission control unit in a case where the distance between bright spots is within a threshold distance.

MODE FOR CARRYING OUT THE INVENTION

Figure 1:
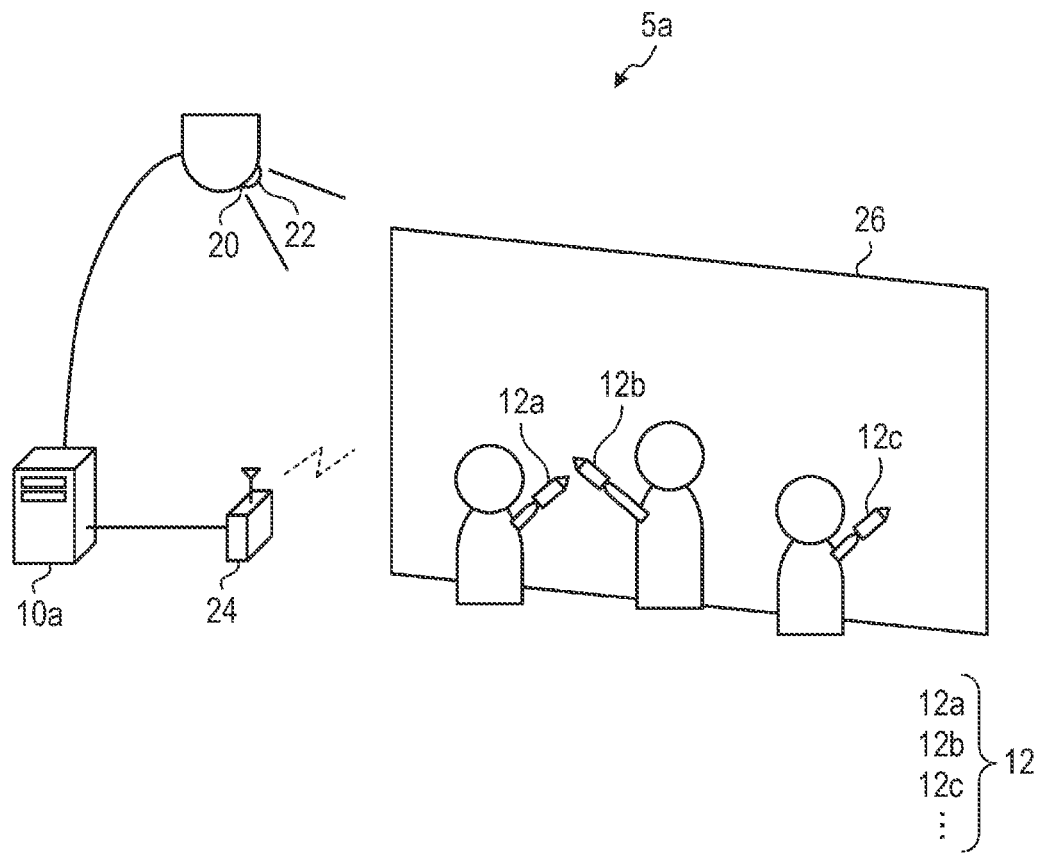
FIG. 1 is a system configuration diagram of an interactive projector according to a first embodiment.

Hereinafter, embodiments of the present disclosure will be described in detail with reference to the drawings. Note that, in each of the following embodiments, same parts are denoted by same reference numerals, and repeated descriptions will be omitted.

Furthermore, the present disclosure will be described according to a following item order.
1. First Embodiment
1-1. Description of Interactive Projector according to First Embodiment
1-2. Description of Structure of Electronic Pen
1-3. Description of Functional Configuration of Interactive Projector
1-4. Description of Flow of Processing performed by Information Processing Apparatus and Electronic Pen
1-5. Description of Input Position Detection Processing and ID Identification Processing of Electronic Pen
1-6. Description of Bright Spot Detection Method
1-7. Description of Exchange Prevention Determination Processing of Electronic Pen
1-8. Description of State Transition of Electronic Pen
1-9. Description of Method of Reflecting Input Result of Electronic Pen
1-10. Effects of First Embodiment
2. Second Embodiment
3. Third Embodiment
4. Fourth Embodiment
5. Fifth Embodiment
6. Application Example (1) of Present Disclosure
7. Application Example (2) of Present Disclosure
8. Application Example (3) of Present Disclosure
9. Application Example (4) of Present Disclosure
10. Application Example (5) of Present Disclosure
11. Application Example (6) of Present Disclosure
12. Application Example (7) of Present Disclosure 1. First Embodiment First, an information processing apparatus 10a according to a first embodiment of the present disclosure will be described.

[1-1. Description of Interactive Projector According to First Embodiment]

A first embodiment is an example in which the information processing apparatus 10a according to the present disclosure is applied to an interactive projector 5a that acquires position information drawn on a white board 26 by a plurality of electronic pens and projects information by a projector at a position corresponding to the acquired position information. FIG. 1 is a system configuration diagram of an interactive projector according to a first embodiment. The interactive projector 5a includes an information processing apparatus 10a, a plurality of electronic pens 12 (12a, 12b, 12c, . . . ), a camera 20, a projector 22, and a wireless communication module 24.

The electronic pen 12 is an information input device that inputs information such as text and figures by being moved while being in contact with a white board or the like. The electronic pens 12 respectively have identification numbers (ID) different from each other, and can be simultaneously used by a plurality of users. Note that the electronic pen 12 is an example of an operation body according to the present disclosure.

The camera 20 is a camera capable of observing infrared light emitted from the electronic pen 12. Note that the camera 20 may include an optical filter which passes only light in a wavelength band included in the infrared light emitted by the electronic pen 12. The camera 20 is provided in a vicinity of the projector 22, and captures an image of at least an area covering a projection range of the projector 22. Note that it is desirable to provide an optical axis of the camera 20 and an optical axis of the projector 22 to be substantially parallel.

The projector 22 projects information according to a trajectory of the electronic pen 12 onto the white board 26 at a position at which information is input by the electronic pen 12. The position according to the trajectory of the electronic pen 12 is, for example, a contact position between a pen tip of the electronic pen 12 and the white board 26. Information according to the electronic pen 12 includes, for example, a color of a line, a thickness of a line, a type of a line, and the like which are set by the electronic pen 12.

The wireless communication module 24 wirelessly connects the information processing apparatus 10a and the electronic pen 12. A form of the wireless connection is, for example, Bluetooth (registered trademark) connection, and is not limited thereto. For example, a wireless local area network (LAN), ZigBee (registered trademark), or the like may be used.

The information processing apparatus 10a detects, from the image captured by the camera 20, a contact position between the white board 26 and the electronic pen 12. Specifically, a contact between the white board 26 and the electronic pen 12 is determined according to an ON/OFF state of a switch 14 (refer to FIG. 2) provided on the electronic pen 12. Then, the contact position between the white board 26 and the electronic pen 12 is detected on the basis of a bright spot position by an IR LED 13 (refer to FIG. 2) provided on the electronic pen 12, the bright spot being included in the image captured by the camera 20. Furthermore, the information processing apparatus 10a causes the projector 22 to project information according to the electronic pen 12 at a position according to the detected contact position.

Note that a configuration in which a display is used as a substitute for the white board 26 and information is input to a front surface of the display by the electronic pen 12 instead of the projector 22 illustrated in FIG. 1 may be used. Furthermore, instead of the projector 22, a screen may be provided at a position of the white board 26, and a rear projection of projecting information from a rear side of the screen may be used. Moreover, a sound output device such as a speaker may be incorporated. Furthermore, the projector 22 may be, for example, a device including a drive mechanism and capable of performing a projection in a certain direction. By including such a mechanism, the projector 22 can display video not only at one location but also at various locations, and can realize an interactive function.

[1-2. Description of Structure of Electronic Pen]

Figure 2:
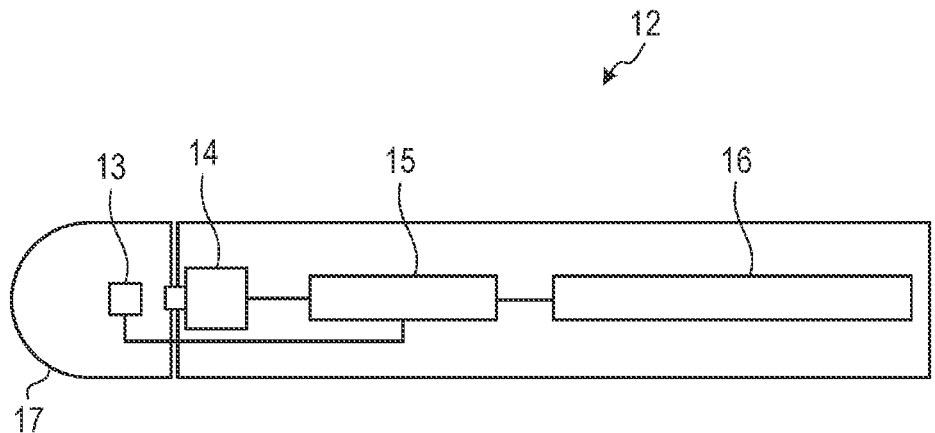
FIG. 2 is a schematic structural diagram illustrating a schematic structure of an electronic pen.

Hereinafter, a structure of the electronic pen 12 will be described with reference to FIG. 2. FIG. 2 is a schematic structural diagram illustrating a schematic structure of the electronic pen.

The electronic pen 12 includes an IR LED 13, a switch 14, a central processing unit (CPU) 15, and a wireless communication module 16.

The IR LED 13 is an LED that is built into a pen tip of the electronic pen 12 and emits infrared light which is invisible to a human and has a wavelength at which an imaging element included in the camera 20 (refer to FIG. 1) has a sensitivity. The IR LED 13 has, for example, a shape in which a front surface of a chip of the LED is sealed with a shell-shaped resin mold 17 facing a direction of the pen tip. The resin mold 17 serves as a lens, and thus the light emitted from the IR LED 13 forms a bright spot having a size according to the shell shape in a vicinity of the pen tip. Therefore, in a case where the IR LED 13 is turned on in a state where the pen tip of the electronic pen 12 is pressed against the white board 26, the camera 20 observes a bright spot by the IR light emitted from the IR LED 13 on a front surface of the white board 26 (refer to FIG. 8). Note that the IR LED 13 is an example of a light emission unit according to the present disclosure.

Note that, even in a case where the electronic pen 12 includes an LED that emits visible light, similar functions as functions to be described below can be realized. On the other hand, in a case where an LED that emits visible light is used, it is necessary that an imaging element included in the camera 20 has a sensitivity to light having an emission wavelength of the LED. Moreover, in a case where an object having a same color as the light emission wavelength of the LED exists in the image observed by the camera 20, noise occurs, and as a result, it is necessary to perform signal processing for removing such noise in some cases.

Furthermore, a side surface of the resin mold 17 is a diffusion surface, and in a case where the IR LED 13 is turned on, the pen tip of the electronic pen 12 also emits diffused light. Therefore, in a case where the electronic pen 12 is separated from the front surface of the white board 26 in a state where the IR LED 13 is turned on, the camera 20 observes a state where the pen tip of the electronic pen 12 emits IR light and shines. Thereby, as will be described later, the information processing apparatus 10a can track a position of the pen tip of the electronic pen 12 separated from the front surface of the white board 26 (refer to a state Sg in FIG. 13). Note that the IR LED 13 is an example of a light emission unit according to the present disclosure.

Note that it is assumed that the IR LEDs 13 included in the plurality of the electronic pens 12 (12a, 12b, 12c, . . . ) all emit infrared light having the same wavelength.

The switch 14 is a switch that operates according to a pressing force acting on the pen tip of the electronic pen 12. That is, the electronic pen 12 includes a mechanism in which the switch 14 is pressed and enters into an ON state in a case where the pen tip of the electronic pen 12 is pressed against a fixed object such as the white board 26 or a wall and the switch 14 is released and enters into an OFF state in a case where the pen tip of the electronic pen 12 is separated from the fixed object. The information processing apparatus 10a determines whether or not the electronic pen 12 is pressed against the white board 26, that is, whether or not the electronic pen 12 is in an input state, on the basis of an operation state of the switch 14.

The CPU 15 controls a turn-on state of the IR LED 13 on the basis of a control command received from the information processing apparatus 10a. Furthermore, the CPU 15 detects the state of the switch 14. Moreover, the CPU 15 receives a control command related to the turn-on state of the IR LED 13 from the information processing apparatus 10a, and transmits the turn-on state of the IR LED 13 and the state of the switch 14 to the information processing apparatus 10a.

The wireless communication module 16 performs wireless communication with the information processing apparatus 10a, and transmits the states of the switch 14 and the IR LED 13 to the information processing apparatus 10a.

Note that, in the present embodiment, it is assumed that the electronic pen 12 is a device having a pen shape as illustrated in FIG. 2. On the other hand, the electronic pen 12 may be a device having a different shape. For example, the electronic pen 12 may be a device such as a spray can in which a spray operation by a user is allowed, or may be a device attached to a hand or a foot of a user.

[1-3. Description of Functional Configuration of Interactive Projector]

Figure 3:
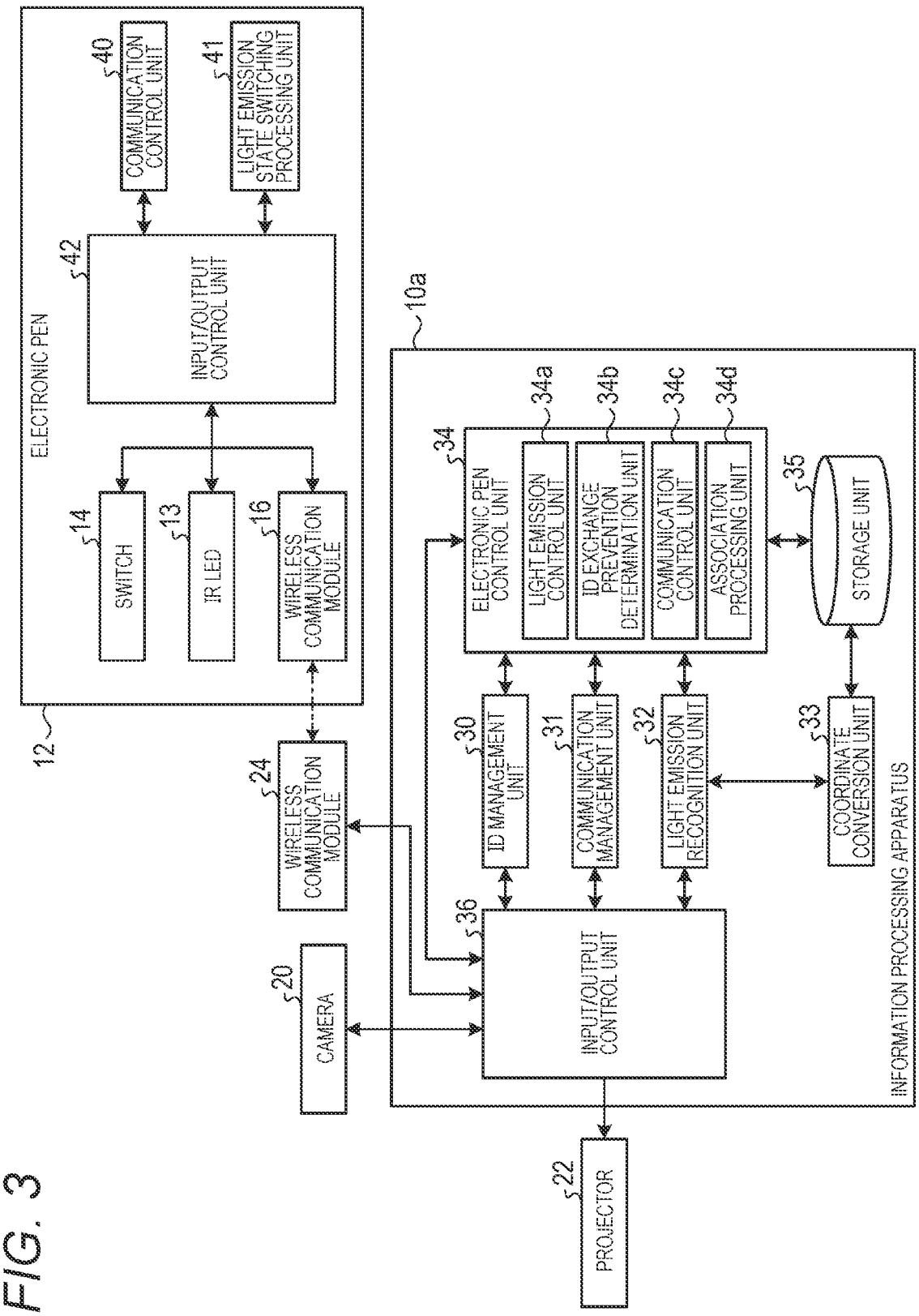
FIG. 3 is a functional block diagram illustrating an example of a functional configuration of the interactive projector.

Next, a functional configuration of the interactive projector 5a will be described with reference to FIG. 3. FIG. 3 is a functional block diagram illustrating an example of a functional configuration of the interactive projector.

First, a functional configuration of the information processing apparatus 10a will be described. The information processing apparatus 10a receives an image captured by the camera 20 and wireless information from the electronic pen 12, performs internal processing, generates information to be projected by the projector 22, and transmits the information to the projector 22. Furthermore, a control command for controlling the turn-on state of the IR LED 13 is transmitted to each of the electronic pens 12.

The information processing apparatus 10a includes an ID management unit 30, a communication management unit 31, a light emission recognition unit 32, a coordinate conversion unit 33, an electronic pen control unit 34, a storage unit 35, and an input/output control unit 36.

The ID management unit 30 manages an identification number (ID) of the electronic pen 12 and a light emission state of the IR LED 13 included in the electronic pen 12.

The communication management unit 31 manages communication device information of each of the electronic pens 12, for example, information indicating that the identification number of the electronic pen 12a is "AA" and the identification number of the electronic pen 12b is "BB".

The light emission recognition unit 32 analyzes the image captured by the camera 20, and detects a position of a bright spot formed by the electronic pen 12 (a coordinate value in a camera coordinate system). Note that the light emission recognition unit 32 is an example of a detection unit according to the present disclosure.

The coordinate conversion unit 33 converts the position of the bright spot detected from the image captured by the camera 20 into a coordinate value in a projector screen coordinate system for projection by the projector 22. Specifically, coordinate conversion is performed using a projection matrix determined on the basis of a positional relationship between the camera 20, the projector 22, and the white board 26.

The electronic pen control unit 34 performs a control of the light emission state of the IR LED 13 included in the electronic pen 12, an ID exchange prevention determination when the plurality of electronic pens 12 approaches each other, and the like. Moreover, the electronic pen control unit 34 further includes a light emission control unit 34a, an ID exchange prevention determination unit 34b, a communication control unit 34c, and an association processing unit 34d.

The light emission control unit 34a turns on the IR LED 13 (light emission unit) included in the electronic pen 12 (operation body) in which communication with the information processing apparatus 10a is established. Furthermore, in a case where different electronic pens 12 approach each other within a predetermined threshold distance, the light emission control unit 34a causes the IR LEDs 13 (light emission units) included in the electronic pens 12 to blink at timings different from each other.

In a case where the plurality of IR LEDs 13 approaches each other within a predetermined distance, the ID exchange prevention determination unit 34b performs exchange prevention determination processing of preventing a bright spot by a certain electronic pen 12 from being erroneously recognized as a bright spot by another electronic pen 12 and preventing the IDs of the electronic pens 12 associated with the positions of the bright spots from being exchanged. Specific processing content will be described later.

The communication control unit 34c receives the state of the switch 14 transmitted from the electronic pen 12 to the information processing apparatus 10a, and transmits a light emission command of the IR LED 13 from the information processing apparatus 10a to the electronic pen 12.

The association processing unit 34d associates the position of the bright spot of the IR LED 13 detected by the camera 20 with the ID of the electronic pen 12, and stores, in the storage unit 35, the position of the bright spot of the IR LED 13 and the ID of the electronic pen 12.

The storage unit 35 stores information in which the position of the bright spot of the IR LED 13 is associated with the ID of the electronic pen 12, and the like. The storage unit 35 includes, for example, a flash ROM or the like.

The input/output control unit 36 determines whether or not the electronic pen 12 is in an information input state on the basis of the state of the switch 14 transmitted from the electronic pen 12. Furthermore, the input/output control unit 36 controls information input and information output between the information processing apparatus 10a, and the camera 20, the projector 22, and the wireless communication module 24 which are connected to the information processing apparatus 10a. Note that the input/output control unit 36 is an example of a display control unit according to the present disclosure.

The electronic pen 12 includes a communication control unit 40, a light emission state switching processing unit 41, and an input/output control unit 42.

The communication control unit 40 performs transmission of the state of the switch 14 of the electronic pen 12 to the information processing apparatus 10a, reception of the light emission command of the IR LED 13 transmitted from the information processing apparatus 10a, and the like.

The light emission state switching processing unit 41 switches the turn-on state (turn-off, turn-on, blinking) of the IR LED 13 according to the light emission command of the IR LED 13 received from the information processing apparatus 10a.

The input/output control unit 42 controls information input and information output between the switch 14, the IR LED 13, the wireless communication module 16, and the CPU 15.

[1-4. Description of Flow of Processing Performed by Information Processing Apparatus and Electronic Pen]

Figure 4:
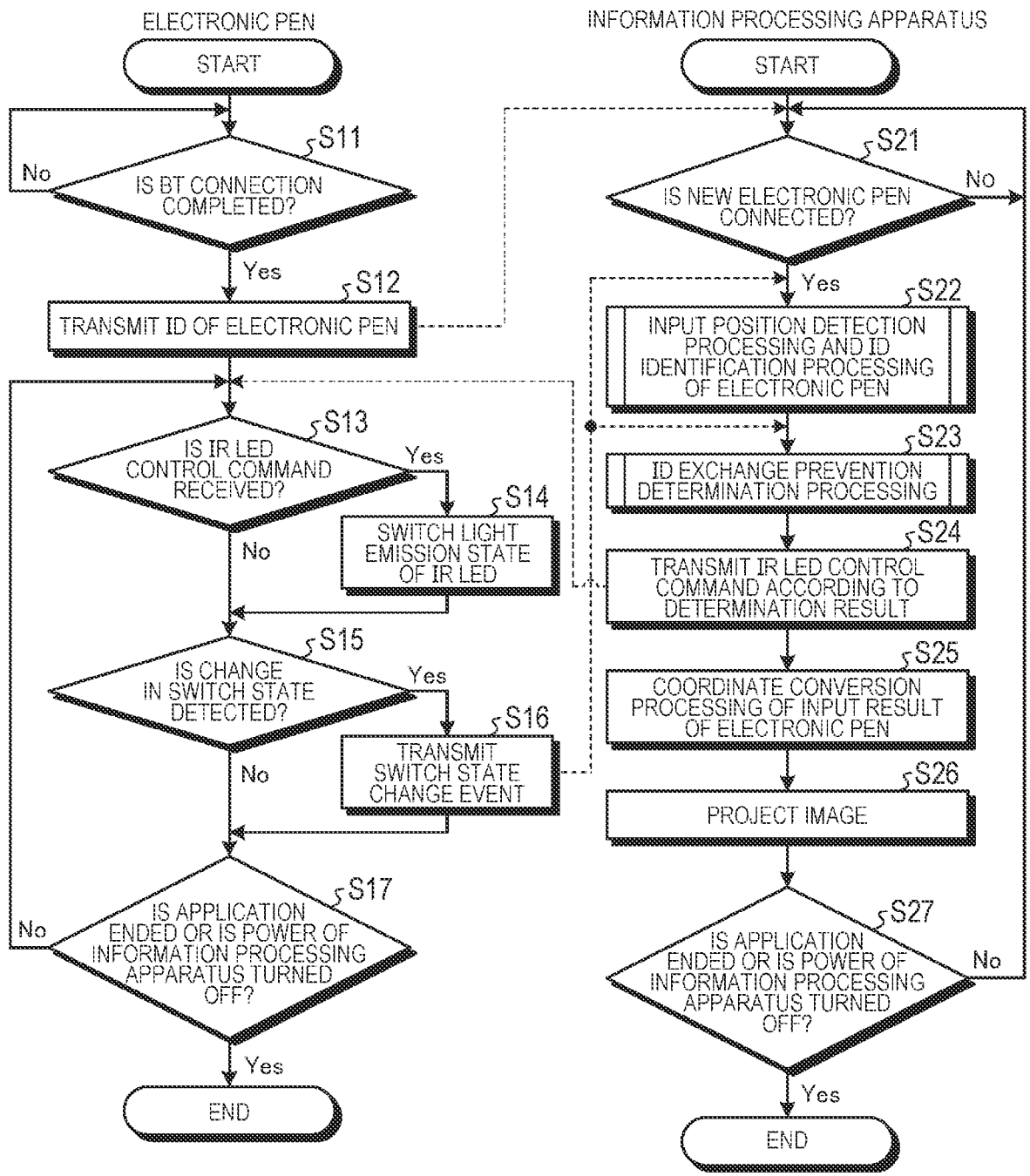
FIG. 4 is a flowchart illustrating an example of a flow of processing performed by an information processing apparatus and the electronic pen according to the first embodiment.

Next, a flow of a series of processing performed by the information processing apparatus 10a and the electronic pen 12 will be described. FIG. 4 is a flowchart illustrating an example of a flow of processing performed by the information processing apparatus and the electronic pen according to the first embodiment.

First, a flow of processing performed by the electronic pen 12 will be described. The wireless communication module 16 performs communication with the wireless communication module 24, and determines whether or not Bluetooth connection (hereinafter, referred to as BT connection) is completed (step S11). In a case where it is determined that BT connection is completed, the process proceeds to step S12. On the other hand, in a case where it is determined that BT connection is not completed, step S11 is repeated.

The communication control unit 40 transmits the ID of the electronic pen 12 to the information processing apparatus 10a (step S12).

The input/output control unit 42 determines whether or not an IR LED control command is received from the information processing apparatus 10a (step S13). In a case where it is determined that an IR LED control command is received (Yes in step S13), the process proceeds to step S14. On the other hand, in a case where it is not determined that an IR LED control command is received (No in step S13), the process proceeds to step S15.

In a case where the determination in step S13 is Yes, the light emission state switching processing unit 41 switches the turn-on state (turn-off, turn-on, blinking) of the IR LED 13 according to the IR LED control command received from the information processing apparatus 10a (step S14). Thereafter, the process proceeds to step S15.

In a case where the determination in step S13 is No, or subsequent to an execution of step S14, the input/output control unit 42 determines whether or not a change in the switch state of the electronic pen 12 is detected (step S15). In a case where it is determined that a change in the switch state of the electronic pen 12 is detected (Yes in step S15), the process proceeds to step S16. On the other hand, in a case where it is not determined that a change in the switch state of the electronic pen 12 is detected (No in step S15), the process proceeds to step S17.

In a case where the determination in step S15 is Yes, the communication control unit 40 transmits, to the information processing apparatus 10a, a switch state change event of the electronic pen 12, that is, information indicating whether the switch 14 is changed from an OFF state to an ON state or from an ON state to an OFF state (step S16). Thereafter, the process proceeds to step S17.

In a case where the determination in step S15 is No, or subsequent to an execution of step S16, the input/output control unit 42 determines whether an application being executed by the information processing apparatus 10a is ended or power of the information processing apparatus 10a is turned off on the basis of a result of communication with the information processing apparatus 10a (step S17). In a case where it is determined that an application being executed by the information processing apparatus 10a is ended or power of the information processing apparatus 10a is turned off (Yes in step S17), the electronic pen 12 ends the processing of FIG. 4. On the other hand, in a case where it is not determined that an application being executed by the information processing apparatus 10a is ended or power of the information processing apparatus 10a is turned off (No in step S17), the process returns to step S13, and each processing described above is repeated.

Next, a flow of processing performed by the information processing apparatus 10a will be described. First, the ID management unit 30 determines whether or not a new electronic pen 12 is connected (step S21). In a case where it is determined that a new electronic pen 12 is connected (Yes in step S21), the process proceeds to step S22. On the other hand, in a case where it is not determined that a new electronic pen 12 is connected (No in step S21), step S21 is repeated.

In a case where the determination in step S21 is Yes, the light emission recognition unit 32 and the association processing unit 34d perform input position detection processing and ID identification processing of the electronic pen 12 (step S22). Note that details of processing performed in step S22 will be described later (refer to FIG. 5).

The ID exchange prevention determination unit 34b performs ID exchange prevention determination processing (step S23). Note that details of processing performed in step S23 will be described later (refer to FIG. 12).

The communication control unit 34c transmits a control command for the IR LED 13 according to a determination result to the electronic pen 12 (step S24).

The coordinate conversion unit 33 performs coordinate conversion processing of converting the bright spot position in the camera coordinate system into a position in the projector screen coordinate system for a projection image generated by the projector 22, the bright spot position being input by the electronic pen 12 (step S25).

The input/output control unit 36 causes the projector 22 to project a video obtained by coordinate conversion in step S25 (step S26). Thereafter, the process proceeds to step S27.

Subsequent to step S26, the input/output control unit 36 determines whether the application is ended or power of the information processing apparatus 10a is turned off (step S27). In a case where it is determined that the application is ended or power of the information processing apparatus 10a is turned off (Yes in step S27), the information processing apparatus 10a ends processing of FIG. 4. On the other hand, in a case where it is not determined that the application is ended or power of the information processing apparatus 10a is turned off (No in step S27), the process returns to step S21.

[1-5. Description of Input Position Detection Processing and ID Identification Processing of Electronic Pen]

Figure 5:
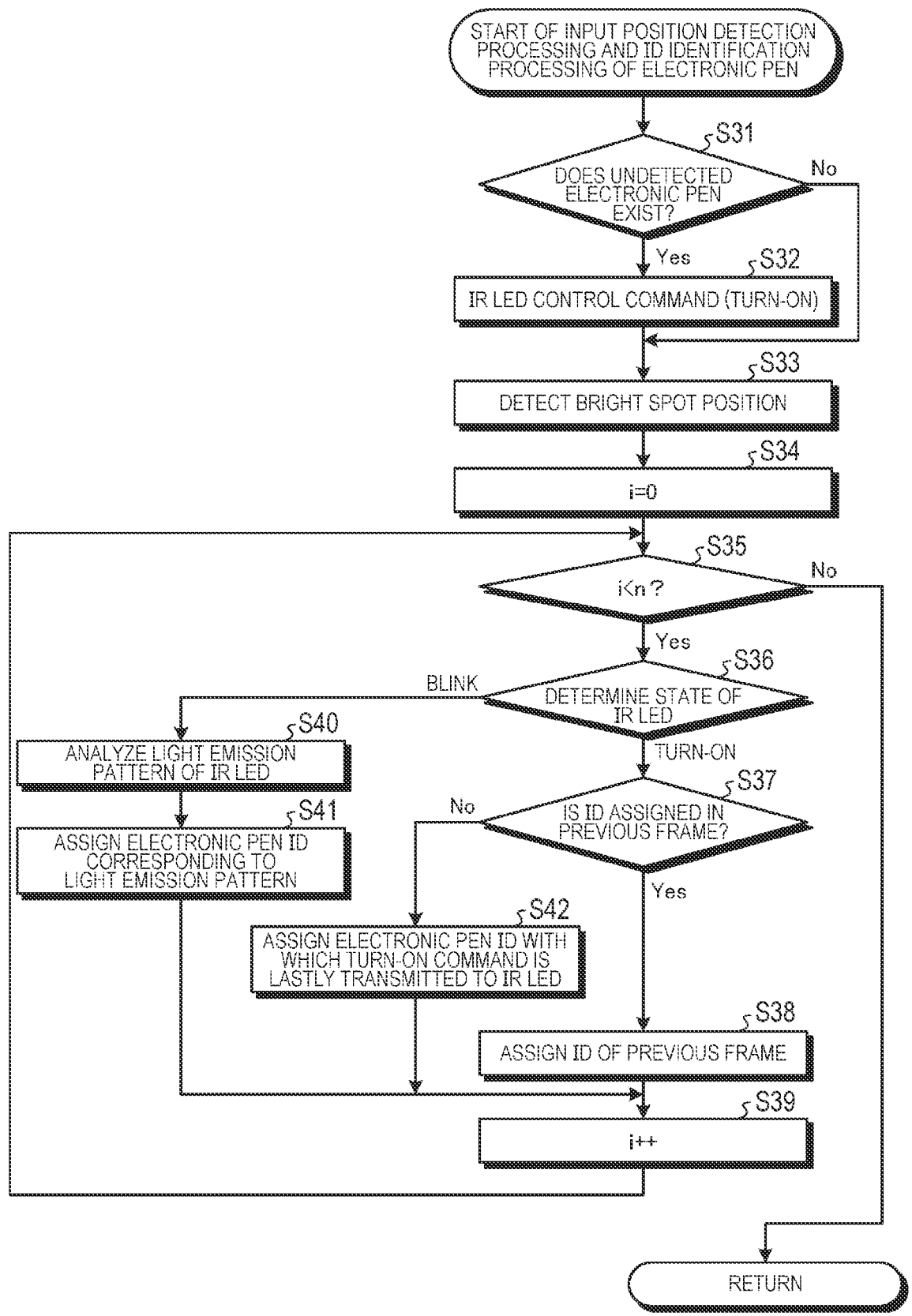
FIG. 5 is a flowchart illustrating an example of a flow of input position detection processing and ID identification processing of the electronic pen.

Next, a flow of input position detection processing and ID identification processing of the electronic pen will be described with reference to FIG. 5. FIG. 5 is a flowchart illustrating an example of a flow of input position detection processing and ID identification processing of the electronic pen.

The ID management unit 30 determines whether or not an undetected electronic pen 12 exists (step S31). In a case where it is determined that an undetected electronic pen 12 exits (Yes in step S31), the process proceeds to step S32. On the other hand, in a case where it is not determined that an undetected electronic pen 12 exists (No in step S31), the process proceeds to step S33. Note that whether an undetected electronic pen 12 exists is determined depending on whether an electronic pen 12 in which the ID of the electronic pen 12 and the bright spot position are not associated with each other exists among the electronic pens 12 connected to each other using BT.

In a case where the determination in step S31 is Yes, the light emission control unit 34a transmits a control command for turning on the IR LED 13 to the undetected electronic pen 12 (step S32).

Next, the light emission recognition unit 32 detects a bright spot position by the IR LED 13 turned on by processing of step S32 (step S33).

The association processing unit 34d sets a variable i representing the electronic pen 12 of current interest to i=0 (step S34). For example, in a case where there are three electronic pens 12, the variable i has a value of i=0, 1, and 2.

The association processing unit 34d determines whether or not the variable i is smaller than a total number n of the bright spots detected by image analysis (step S35). In a case where it is determined that the variable i is smaller than the total number n of the bright spots (Yes in step S35), the process proceeds to step S36. On the other hand, in a case where it is not determined that the variable i is smaller the total number n of the bright spots (No in step S35), processing of FIG. 5 is ended, and the process returns to a main routine (step S23 in FIG. 4).

In a case where the determination in step S35 is Yes, the ID management unit 30 determines a state of the IR LED 13 (step S36). In a case where it is determined that the IR LED 13 is in a turn-on state, the process proceeds to step S37. On the other hand, in a case where it is determined that the IR LED 13 is in a blinking state, the process proceeds to step S40.

In a case where it is determined in step S36 that the IR LED 13 is in a turn-on state, the association processing unit 34d determines whether or not an ID is assigned to the IR LED 13 in a previous frame (step S37). In a case where it is determined that an ID is assigned in the previous frame (Yes in step S37), the process proceeds to step S38. On the other hand, in a case where it is not determined that an ID is assigned in the previous frame (No in step S37), the process proceeds to step S42.

Returning to step S36, in a case where it is determined that the IR LED 13 is in a blinking state, the ID management unit 30 analyzes a light emission pattern of the IR LED 13 (step S40).

Next, the ID management unit 30 assigns an electronic pen ID corresponding to the light emission pattern (step S41). Thereafter, the process proceeds to step S39.

Returning to step S37, in a case where the determination in step S37 is Yes, the association processing unit 34d assigns the ID of the previous frame (step S38). Thereafter, the process proceeds to step S39.

On the other hand, in a case where the determination in step S37 is No, the association processing unit 34d assigns an electronic pen ID with which a turn-on command is lastly transmitted to the IR LED 13 (step S42). Thereafter, the process proceeds to step S39.

Subsequent to step S38, step S41, and step S42, the association processing unit 34d performs increment of the variable i (step S39). Thereafter, the process returns to step S35.

In this way, by executing the flowchart of FIG. 5, every time a new bright spot is detected, a new ID of the electronic pen 12 is assigned, and the bright spot once assigned with the ID is tracked in a state where the same ID is assigned.

Figure 6:
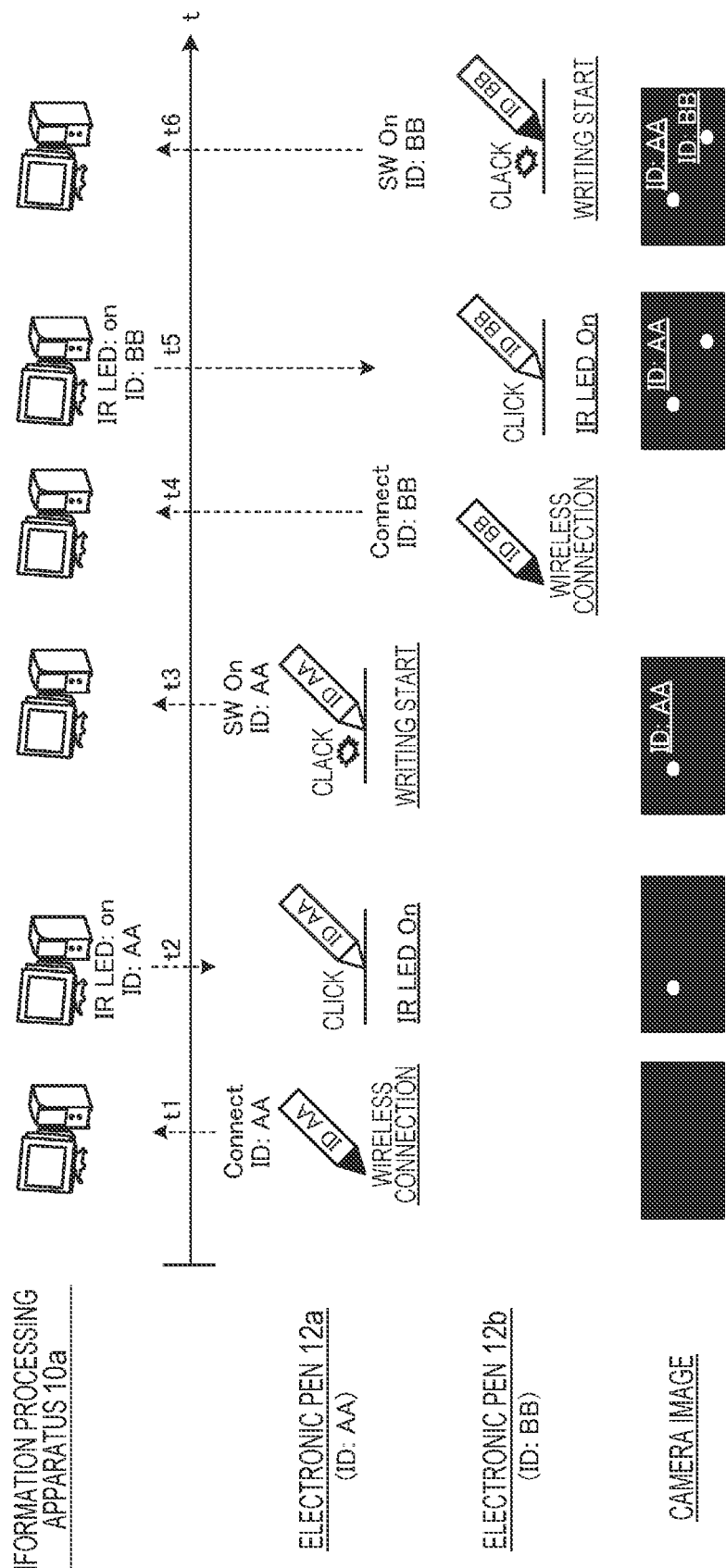
FIG. 6 is a time chart illustrating a flow of processing in which the interactive projector according to the first embodiment identifies the electronic pen.

Next, a flow of processing in which the interactive projector 5a identifies the electronic pen 12 will be described with reference to a time chart of FIG. 6. FIG. 6 is a time chart illustrating a flow of processing in which the interactive projector according to the first embodiment identifies the electronic pen.

As illustrated in FIG. 6, it is assumed that there are two electronic pens (the electronic pen 12a and the electronic pen 12b). Each of the two pens stores an identification number (ID). Here, as an example of the identification number, it is assumed that the identification number of the electronic pen 12a is "AA" and the identification number of the electronic pen 12b is "BB".

At a time t1, the electronic pen 12a and the information processing apparatus 10a are connected to each other using BT.

At a time t2, the information processing apparatus 10a transmits a control command for turning on the IR LED 13 to the electronic pen 12a connected using BT. The electronic pen 12a receives the control command and turns on the IR LED 13. At this time, a bright spot generated by light emission of the IR LED 13 of the electronic pen 12a is observed in the camera image captured by the camera 20.

At a time t3, the electronic pen 12a is pressed against the white board 26, and the switch 14 of the pen tip is switched on. At this time, the identification number "AA" of the electronic pen 12a and information indicating that the switch 14 is switched on are transmitted from the electronic pen 12a to the information processing apparatus 10a. At this time, a bright spot generated by light emission of the IR LED 13 of the electronic pen 12a is observed in the camera image captured by the camera 20. Thereafter, the electronic pen 12a performs drawing on the white board 26.

At a time t4, the electronic pen 12b and the information processing apparatus 10a are connected to each other using BT.

At a time t5, the information processing apparatus 10a transmits a control command for turning on the IR LED 13 to the electronic pen 12b connected using BT. The electronic pen 12b receives the control command and turns on the IR LED 13. At this time, a bright spot generated by light emission of the IR LED 13 of the electronic pen 12a and a bright spot generated by light emission of the IR LED 13 of the electronic pen 12b are observed in the camera image captured by the camera 20.

At a time t6, the electronic pen 12b is pressed against the white board 26, and the switch 14 of the pen tip is switched on. At this time, the identification number "BB" of the electronic pen 12b and information indicating that the switch 14 is switched on are transmitted from the electronic pen 12b to the information processing apparatus 10a. At this time, a bright spot generated by light emission of the IR LED 13 of the electronic pen 12a and a bright spot generated by light emission of the IR LED 13 of the electronic pen 12b are observed in the camera image captured by the camera 20. Thereafter, the electronic pens 12a and 12b perform drawing on the white board 26.

Note that the information processing apparatus 10a receives drawing input by the electronic pen 12 and reflects a drawing input result to the application only in a case where the bright spot of the IR LED 13 of the electronic pen 12 is detected, the ID of the electronic pen 12 is identified, and the switch 14 of the electronic pen 12 is switched on.

[1-6. Description of Bright Spot Detection Method]

Figure 7:
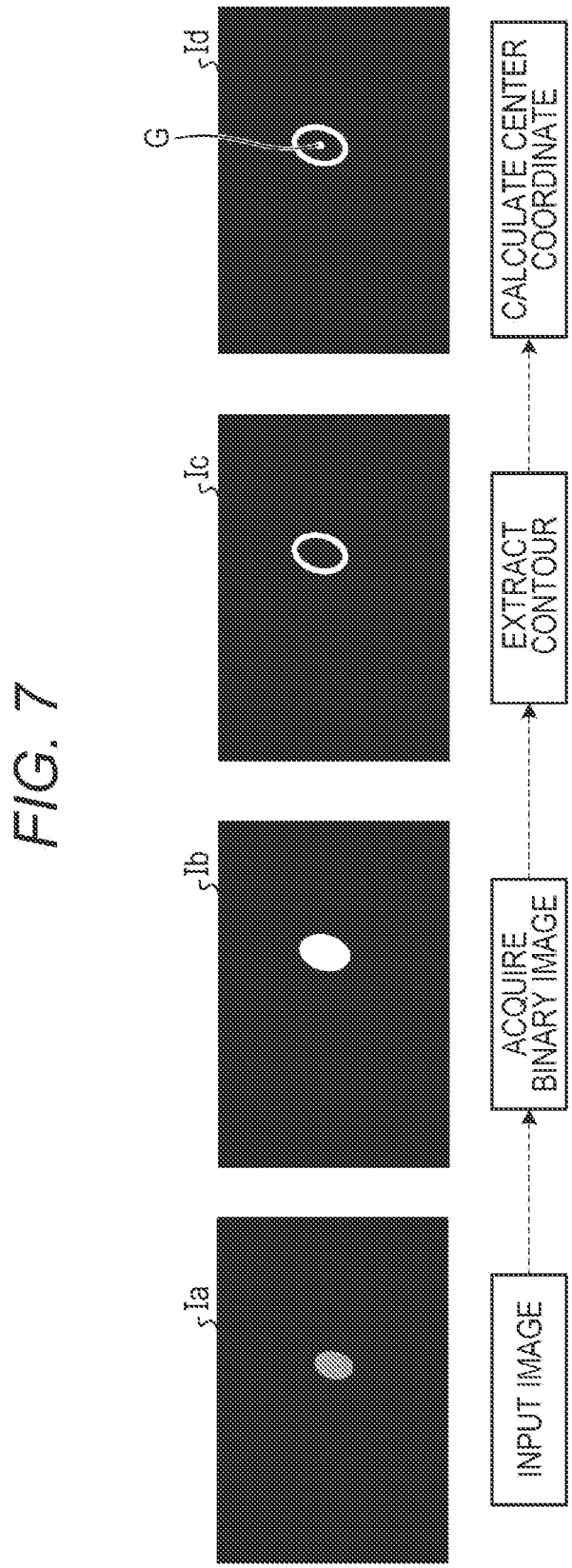
FIG. 7 is a diagram for explaining a bright spot detection method.

Next, a method in which the light emission recognition unit 32 detects a bright spot generated by the IR LED 13 will be described with reference to FIG. 7. FIG. 7 is a diagram for explaining a bright spot detection method.

The light emission recognition unit 32 generates a binary image Ib by binarizing the image Ia captured by the camera 20 using a predetermined brightness threshold value.

Next, the light emission recognition unit 32 extracts a contour of the binary image Ib (image Ic).

Then, the light emission recognition unit 32 obtains a center position G of the contour in the image Ic (image Id). The center position G obtained in this way is set as a bright spot position.

Note that a method of calculating the bright spot position is not limited to the method in FIG. 7. For example, a method of obtaining an area center of an area of the bright spot in the binary image Ib and setting the area center as a bright spot position may be used.

Furthermore, in a case where a plurality of electronic pens 12 is simultaneously used, a plurality of bright spots is observed in the image Ia. Therefore, the light emission recognition unit 32 performs labeling processing of assigning a number to each area on the binary image Ib. Then, a position of each bright spot is obtained by performing image processing illustrated in FIG. 7 on each labeled area.

[1-7. Description of ID Exchange Prevention Determination Processing of Electronic Pen]

Next, ID exchange prevention determination processing of the electronic pen 12 will be described with reference to FIG. 8. FIG. 8 is a diagram for explaining an outline of ID exchange determination processing based on a distance between bright spots.

In a case where a plurality of electronic pens 12 (for example, the electronic pen 12a (ID: AA) and the electronic pen 12b (ID: BB)) simultaneously performs drawing, as illustrated in FIG. 8, the electronic pen 12a and the electronic pen 12b may approach each other. In such a case, the information processing apparatus 10a may erroneously recognize the position of the bright spot generated by the electronic pen 12a as the position of the bright spot generated by the electronic pen 12b. For example, in FIG. 8, it is assumed that the electronic pen 12a and the electronic pen 12b respectively make a U-turn immediately before contacting each other. In this case, the information processing apparatus 10a may determine that the electronic pen 12a and the electronic pen 12b cross each other, and may erroneously recognize the bright spot generated by the electronic pen 12a as the bright spot generated by the electronic pen 12b. Then, similarly, the bright spot generated by the electronic pen 12b may be erroneously recognized as the bright spot generated by the electronic pen 12a. In a case where such an erroneous recognition occurs, ID: BB is assigned to the bright spot generated by the electronic pen 12a, and ID: AA is assigned to the bright spot generated by the electronic pen 12b. That is, an ID exchange occurs.

In order to prevent such an ID exchange, the information processing apparatus 10a according to the present embodiment issues an IR LED control command according to the state of each of the electronic pens 12 in a case where positions of the bright spots generated by the plurality of electronic pens 12 are within a threshold distance d. Specifically, for example, in a case where two electronic pens 12a and 12b are both in an input state (drawing state) and approach each other within a threshold distance d, by causing the electronic pens 12a and 12b to blink in a time-division manner, the position of the bright spot generated by each electronic pen can be reliably detected. Note that, for the sake of simplicity, in the following, a case where positions of the plurality of bright spots generated by light emission of the IR LEDs 13 of the plurality of electronic pens 12 approach each other within the threshold distance d is expressed as "a case where the plurality of electronic pens 12 approaches each other within the threshold distance d".

Note that it is desirable that the threshold distance d is determined on the basis of a value obtained by performing coordinate conversion to an actual size obtained by projection of the projector 22, instead of a difference in detection positions in the image captured by the camera 20. As will be described later, the information processing apparatus 10a converts the detected bright spot position into a position in the projector screen coordinate system in a case where the projector 22 projects the input result of the electronic pen 12 onto the white board 26. At this time, by measuring an actual size of the white board 26, a distance between the bright spot positions in the image captured by the camera 20 can be scaled up to the actual size, and it is possible to perform a threshold determination as to whether coordinate values after conversion approach each other within the threshold distance d. Note that the threshold distance d may be a parameter which can be freely set by a user or a fixed threshold distance d may be set at a time of manufacturing. Furthermore, as will be described in a fourth embodiment, the threshold distance d may be dynamically changed according to a drawing state of the electronic pen 12.

An example in which the threshold distance d is set by converting a size of the bright spot of the IR LED 13 observed from the camera 20 into an actual size will be described. For example, in a case where a diameter of the bright spot by the IR LED 13 converted into the actual size is 5 cm, the threshold distance d is set to d=20 cm (the diameter of the bright spot+10 cm). This is an example in which a minimum distance of a bright spot area when the IR LED 13 is observed is 10 cm and 10 cm is added as a buffer until the ID can be identified from the light emission pattern of the IR LED 13 in a case where the light emission pattern is changed and is detected by the camera 20.

Next, content of the IR LED control command issued by the light emission control unit 34a (refer to FIG. 3) in a case where the positions of the bright spots generated by the plurality of electronic pens 12 are within the threshold distance d will be described with reference to FIG. 9. FIG. 9 is a diagram for explaining an IR LED control command issued by the light emission control unit in a case where the distance between the bright spots is within the threshold distance.

In FIG. 9, a state of the electronic pen 12 being "inputting" indicates a state where a bright spot by the IR LED 13 is detected, an identification number of the electronic pen 12 including the IR LED 13 which emits light and forms the bright spot is identified, and the switch 14 of the electronic pen 12 is switched on. Then, a state of the electronic pen 12 being "not inputting" indicates a state where a bright spot by the IR LED 13 is detected, an identification number of the electronic pen 12 including the IR LED 13 which emits light and forms the bright spot is identified, and the switch 14 of the electronic pen 12 is switched off.

Hereinafter, four cases (a) to (d) illustrated in FIG. 9 will be specifically described. Note that, in order to simplify a description, a case where another electronic pen 12 approaches an electronic pen 12 of interest (an electronic pen 12 as a control target) within the threshold distance d is assumed.

A state (a) is a case where the electronic pen 12 as a control target and the another electronic pen 12 are both "inputting". In this case, the information processing apparatus 10a transmits, to both the electronic pens 12, a control command for alternately blinking both the electronic pens 12 in a time-division manner.

A state (b) is a case where the electronic pen 12 as a control target is "inputting" and the another electronic pen 12 is "not inputting". In this case, the information processing apparatus 10a transmits, to the electronic pen 12 as a control target, a control command for turning on the IR LED 13. Furthermore, a control command for turning off the IR LED 13 is transmitted to the another electronic pen 12.

A state (c) is a case where the electronic pen 12 as a control target is "not inputting" and the another electronic pen 12 is "inputting". In this case, the information processing apparatus 10a transmits, to the electronic pen 12 as a control target, a control command for turning off the IR LED 13. Furthermore, a control command for turning on the IR LED 13 is transmitted to the another electronic pen 12.

A state (d) is a case where the electronic pen 12 as a control target and the another electronic pen 12 are both "not inputting". In this case, the information processing apparatus 10a transmits, to both the electronic pens 12, a control command for alternately blinking both the electronic pens 12 in a time-division manner.

In a case where the IR LEDs 13 are caused to alternately blink in a time-division manner as in the state (a), a generation time of the bright spot by a specific electronic pen 12 is shortened, and thus a frame rate when detecting the bright spot position is decreased. Therefore, in a case where one electronic pen 12 is "inputting" as in the state (b) and the state (c), by turning off the IR LED 13 of the electronic pen 12 being "not inputting", the electronic pen 12 being "not inputting" enters into a lost state. In this way, by creating a state where only one electronic pen 12 is "inputting", it is possible to prevent a decrease in the frame rate.

Furthermore, in a case where the two electronic pens 12 are both "not inputting" as in the state (d), in order to continue ID identification, the IR LEDs 13 are caused to blink in a time-division manner. In this case, the frame rate is decreased, while tracking of the bright spot position by each of the electronic pens 12 can be continuously performed.

Figure 10:
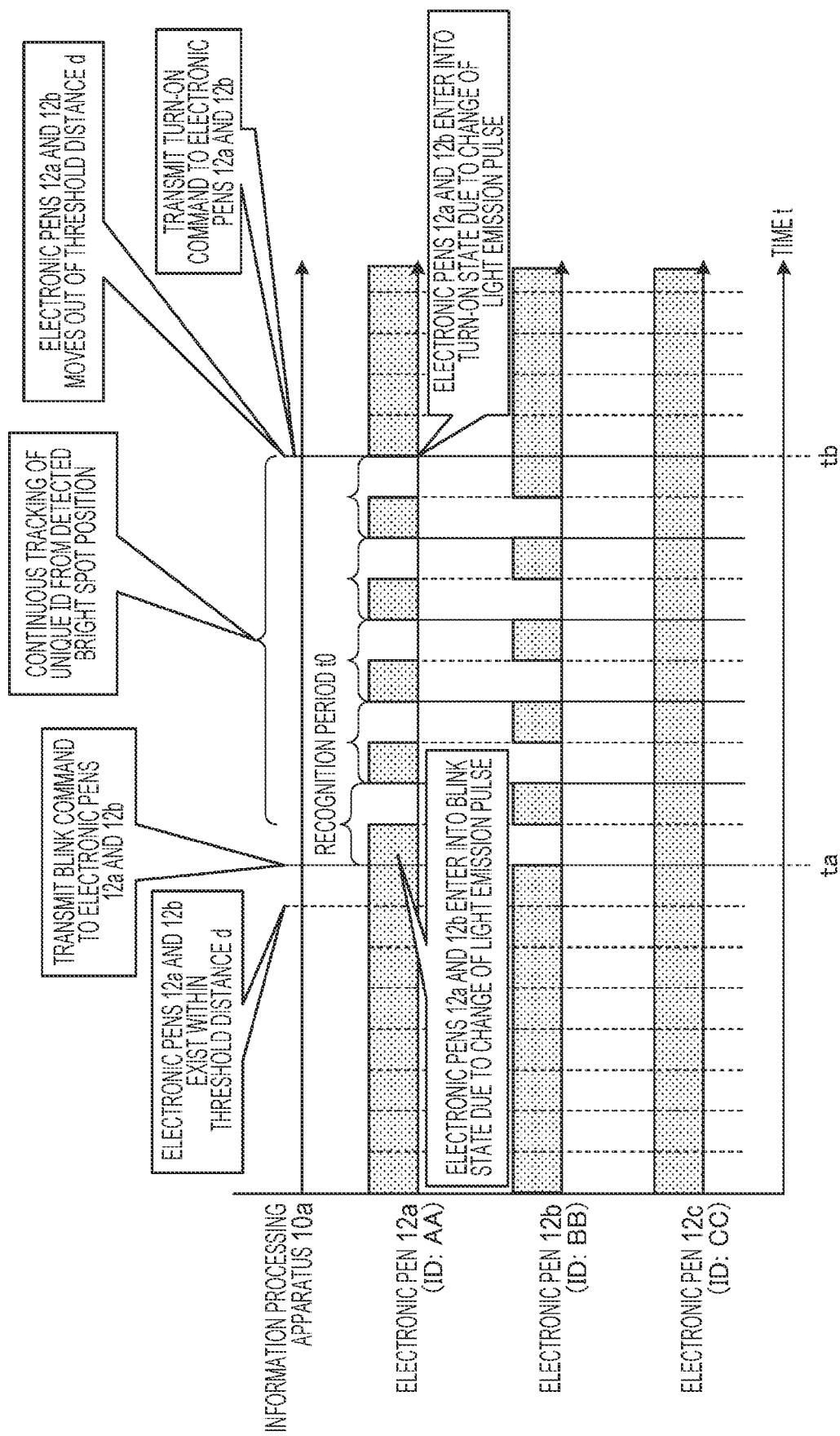
FIG. 10 is a time chart illustrating an example of ID exchange prevention in a case of two electronic pens.
Figure 11:
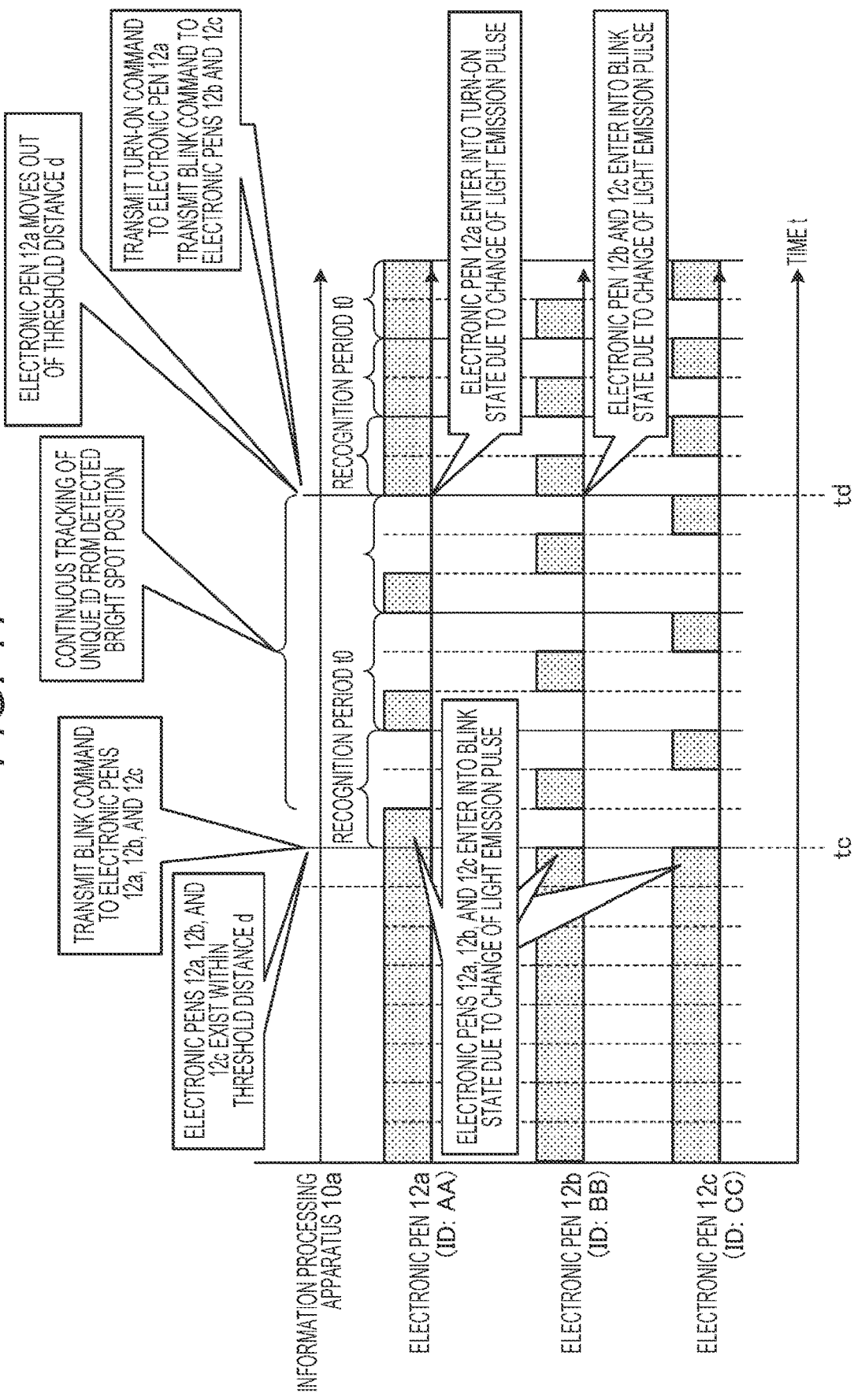
FIG. 11 is a time chart illustrating an example of ID exchange prevention in a case of three electronic pens.

Next, a specific example of ID exchange prevention will be described with reference to FIG. 10 and FIG. 11. FIG. 10 is a time chart illustrating an example of ID exchange prevention in a case of two electronic pens. FIG. 11 is a time chart illustrating an example of ID exchange prevention in a case of three electronic pens.

The time chart in FIG. 10 illustrates light emission states of the IR LEDs 13 in a case where three electronic pens 12a (ID: AA), 12b (ID: BB), and 12c (ID: CC) are both in an input state and two electronic pens 12a and 12b among the electronic pens approach each other within a threshold distance d.

In FIG. 10, at a time ta, the electronic pens 12a and 12b approach each other within the threshold distance d, and the state matches with a condition of the state (a) described with reference to FIG. 9. Then, after the time ta, the IR LED 13 of the electronic pen 12a and the IR LED 13 of the electronic pen 12b alternately and repeatedly blink in a time-division manner. More specifically, the IR LED 13 of the electronic pen 12a and the IR LED 13 of the electronic pen 12b alternately and repeatedly blink at time intervals obtained by dividing a predetermined recognition period t0 into two. Note that the recognition period t0 is set to a time during which, in a case where the IR LED 13 blinks, the camera 20 performs image capturing at least one or more times while the IR LED 13 is turned on and the light emission recognition unit 32 can recognize a bright spot position. That is, the information processing apparatus 10a can recognize timings at which the electronic pens 12a and 12b emit light while the IR LEDs 13 repeatedly blink. Thus, the information processing apparatus 10a can perform continuous tracking of the bright spot positions by the electronic pens 12a and 12b on the basis of the bright spot positions recognized by the light emission recognition unit 32.

Then, in FIG. 10, at a time tb, in a case where the electronic pens 12a and 12b are separated from each other farther than the threshold distance d, the information processing apparatus 10a transmits a turn-on command to the electronic pens 12a and 12b. Thereby, after the time tb, the IR LED 13 of the electronic pen 12a and the IR LED 13 of the electronic pen 12b are both in a turn-on state.

The time chart in FIG. 11 illustrates light emission states of the IR LEDs 13 in a case where three electronic pens 12a (ID: AA), 12b (ID: BB), and 12c (ID: CC) are both in an input state and the three electronic pens 12a, 12b, and 12c approach each other within a threshold distance d.

In FIG. 11, at a time tc, the electronic pens 12a, 12b, and 12c approach each other within the threshold distance d, and the state matches with a condition of the state (a) described with reference to FIG. 9. Then, after the time tc, the IR LED 13 of the electronic pen 12a, the IR LED 13 of the electronic pen 12b, and the IR LED 13 of the electronic pen 12c alternately and repeatedly blink in a time-division manner. More specifically, the IR LED 13 of the electronic pen 12a, the IR LED 13 of the electronic pen 12b, and the IR LED 13 of the electronic pen 12c alternately and repeatedly blink at time intervals obtained by dividing a recognition period t0 into three. The information processing apparatus 10a can recognize timings at which the electronic pens 12a, 12b, and 12c emit light while the IR LEDs 13 repeatedly blink. Thus, the information processing apparatus 10a can perform continuous tracking of the bright spot positions by the electronic pens 12a, 12b, and 12c on the basis of the bright spot positions recognized by the light emission recognition unit 32.

Then, in FIG. 11, at a time td, in a case where the electronic pen 12a is separated from the electronic pens 12b and 12c farther than the threshold distance d, the information processing apparatus 10a transmits a turn-on command to the electronic pen 12a. Thereby, after the time td, the IR LED 13 of the electronic pen 12a is in a turn-on state. Then, the electronic pens 12b and 12c remain in a state of being approached to each other within the threshold distance d. Thus, the IR LED 13 of the electronic pen 12b and the IR LED 13 of the electronic pen 12c alternately and repeatedly blink at time intervals obtained by dividing a recognition period t0 into two. Note that, in the example of FIG. 11, a blinking time when the IR LED 13 blinks is set to be constant. Therefore, the recognition period t0 from the time tc at which the three electronic pens 12 approach each other and to the time td is set to be longer than the recognition period t0 after the time td at which the two electronic pens 12 approach each other.

Figure 12:
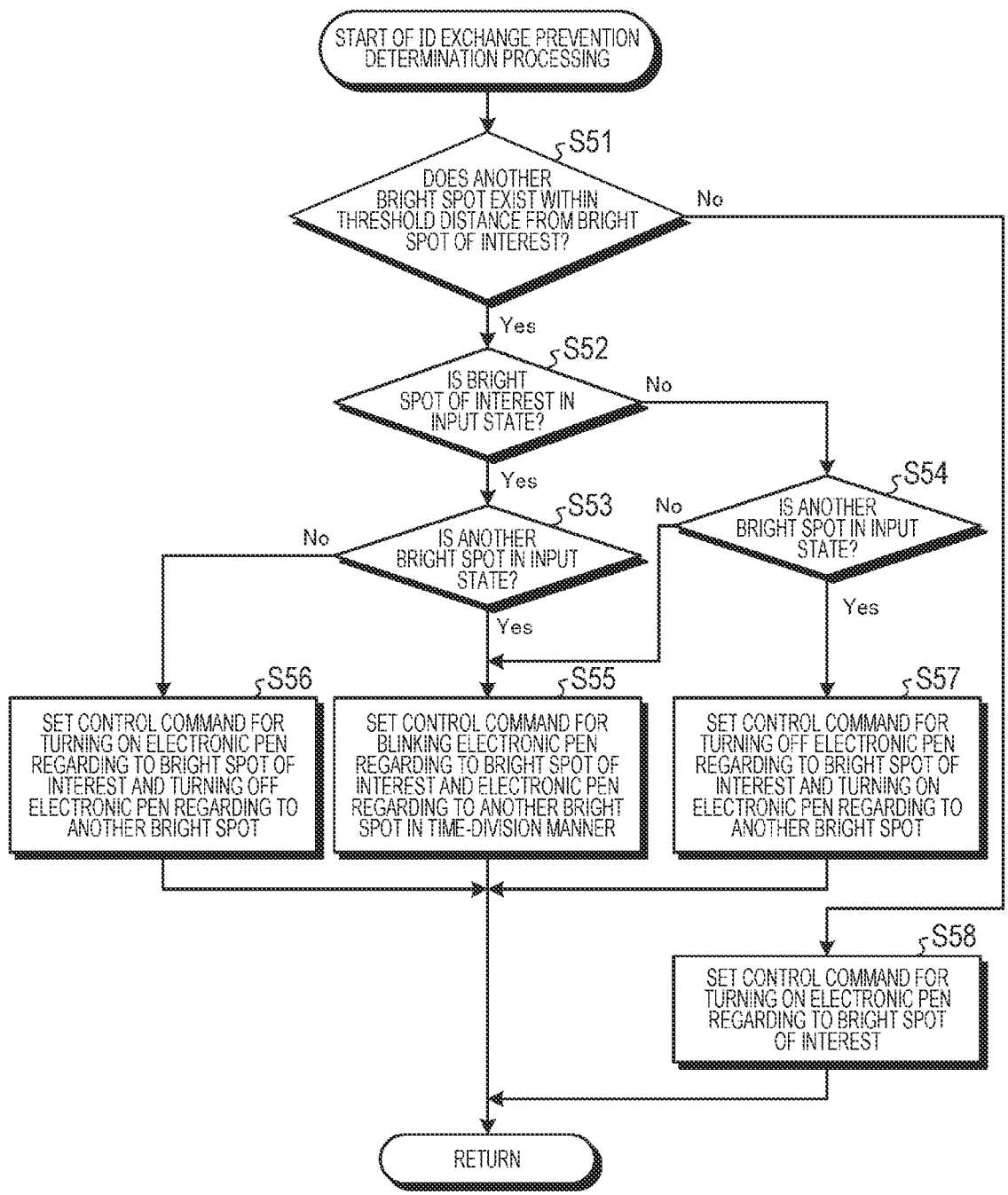
FIG. 12 is a flowchart illustrating an example of a flow of ID exchange prevention determination processing of the electronic pen.

Next, a flow of ID exchange prevention determination processing of the electronic pen will be described with reference to FIG. 12. FIG. 12 is a flowchart illustrating an example of a flow of ID exchange prevention determination processing of the electronic pen.

The light emission recognition unit 32 determines whether or not another bright spot exists within the threshold distance d from the bright spot of interest (step S51). In a case where it is determined that another bright spot exists within the threshold distance d from the bright spot of interest (Yes in step S51), the process proceeds to step S52. On the other hand, in a case where it is not determined that another bright spot exists within the threshold distance d from the bright spot of interest (No in step S51), the process proceeds to step S58.

In a case where the determination in step S51 is Yes, the ID exchange prevention determination unit 34b determines whether or not the bright spot of interest (the electronic pen 12 related to the bright spot) is in an input state (step S52). In a case where it is determined that the bright spot of interest (the electronic pen 12 related to the bright spot) is in an input state (Yes in step S52), the process proceeds to step S53. On the other hand, in a case where it is not determined that the bright spot of interest (the electronic pen 12 related to the bright spot) is in an input state (No in step S52), the process proceeds to step S54.

In a case where the determination in step S52 is Yes, the ID exchange prevention determination unit 34b determines whether or not the another bright spot (the electronic pen 12 related to the another bright spot) is in an input state (step S53). In a case where it is determined that the another bright spot (the electronic pen 12 related to the another bright spot) is in an input state (Yes in step S53), the process proceeds to step S55. On the other hand, in a case where it is not determined that the another bright spot (the electronic pen 12 related to the another bright spot) is in an input state (No in step S53), the process proceeds to step S56.

Returning to step S52, in a case where the determination in step S52 is No, the ID exchange prevention determination unit 34b determines whether or not the another bright spot (the electronic pen 12 related to the another bright spot) is in an input state (step S54). In a case where it is determined that the another bright spot (the electronic pen 12 related to the another bright spot) is in an input state (Yes in step S54), the process proceeds to step S57. On the other hand, in a case where it is not determined that the another bright spot (the electronic pen 12 related to the another bright spot) is in an input state (No in step S54), the process proceeds to step S55.

In a case where the determination in step S53 is Yes, or in a case where the determination in step S54 is No, the light emission control unit 34a sets a control command for blinking the electronic pen 12 related to the bright spot of interest and the electronic pen 12 related to the another bright spot in a time-division manner (step S55). Thereafter, processing of FIG. 12 is ended, and the process returns to the main routine (step S24 in FIG. 4).

In a case where the determination in step S53 is No, the light emission control unit 34a sets a control command for turning on the electronic pen 12 related to the bright spot of interest and turning off the electronic pen 12 related to the another bright spot (step S56). Thereafter, processing of FIG. 12 is ended, and the process returns to the main routine (step S24 in FIG. 4).

In a case where the determination in step S54 is Yes, the light emission control unit 34a sets a control command for turning off the electronic pen 12 related to the bright spot of interest and turning on the electronic pen 12 related to the another bright spot (step S57). Thereafter, processing of FIG. 12 is ended, and the process returns to the main routine (step S24 in FIG. 4).

In a case where the determination in step S51 is No, the light emission control unit 34a sets a control command for turning on the electronic pen 12 related to the bright spot of interest (step S58). Thereafter, processing of FIG. 12 is ended, and the process returns to the main routine (step S24 in FIG. 4).

[1-8. Description of State Transition of Electronic Pen]

Figure 13:
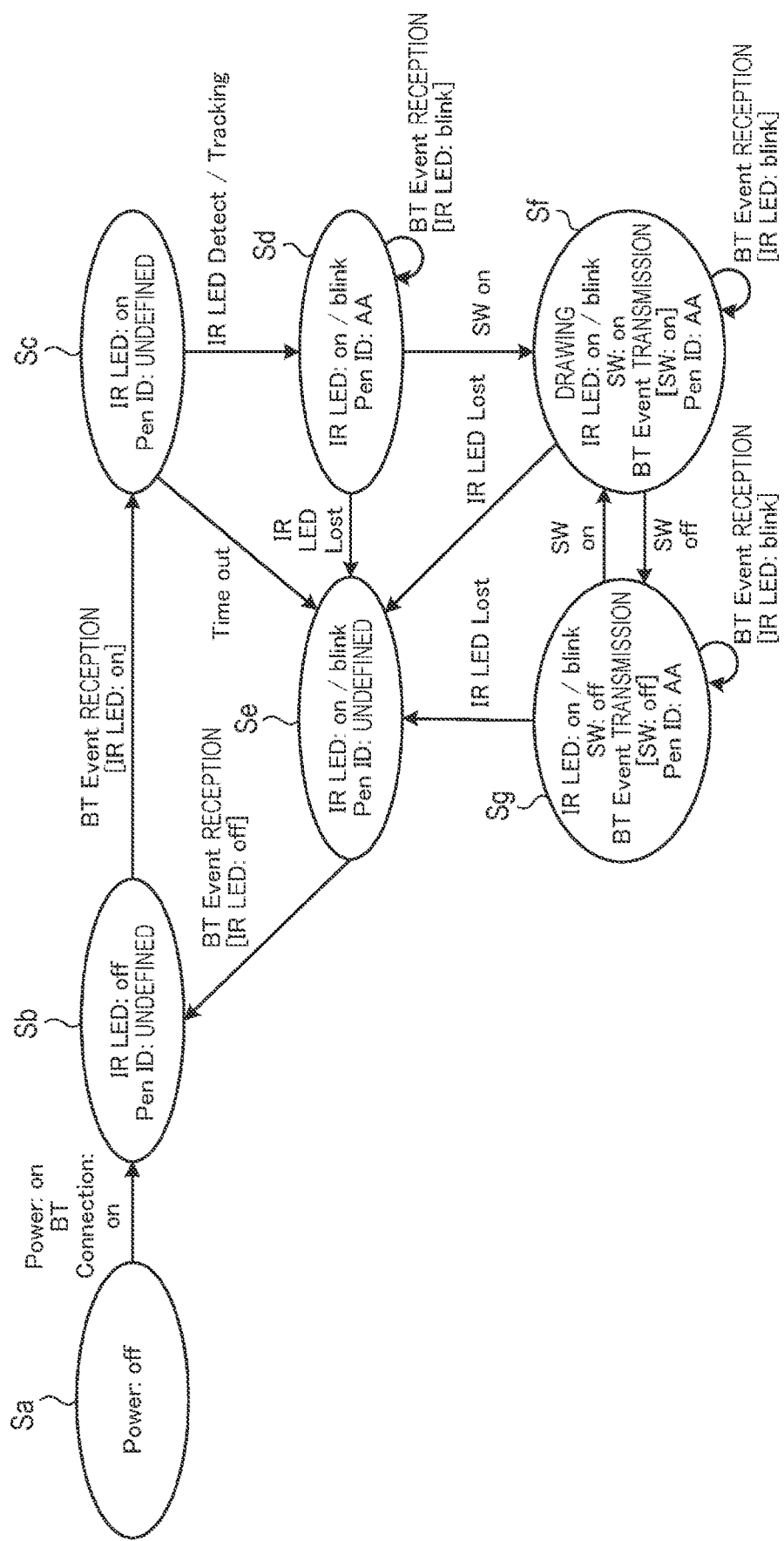
FIG. 13 is a state transition diagram illustrating an example of state transition of the electronic pen.

Next, state transition of the electronic pen 12 will be described with reference to FIG. 13. FIG. 13 is a state transition diagram illustrating an example of state transition of the electronic pen.

In a state Sa illustrated in FIG. 13, the interactive projector 5a is in an initial state in which power is turned off. In a case where power of the interactive projector 5a is turned on in the state Sa, BT connection between the information processing apparatus 10a and the electronic pen 12 enters into an ON state. As a result, the interactive projector 5a transitions to a state Sb. In the state Sb, the IR LED 13 is turned off, and the identification number of the electronic pen 12 is undefined.

In a case where the input/output control unit 36 of the information processing apparatus 10a receives, from the electronic pen 12, a BT event for turning on the IR LED 13, the light emission control unit 34a transmits a light emission instruction of the IR LED 13 to the electronic pen 12. Thereby, the IR LED 13 of the electronic pen 12 is turned on. Here, the identification number of the electronic pen 12 remains undefined (state Sc).

The light emission recognition unit 32 of the information processing apparatus 10a acquires a position of a bright spot generated by turn-on or blinking of the IR LED 13 of the electronic pen 12. Then, in a case where the light emission recognition unit 32 detects the bright spot position, the association processing unit 34d associates the bright spot position with the identification number of the electronic pen 12. Thereby, the IR LED 13 continues to be turned on or blink, and the identification number of the electronic pen 12 is determined (state Sd).

On the other hand, in a case where the light emission recognition unit 32 cannot acquire the bright spot position within a predetermined time, the identification number of the electronic pen 12 remains undefined (state Se).

In the state Sd, in a case where the pen tip of the electronic pen 12 comes into contact with the white board 26 and the switch 14 is turned on, the electronic pen 12 transmits a BT event indicating switch on. Thereafter, the IR LED 13 continues to be turned on or blink, and the positions of the bright spots which are sequentially recognized are associated with the identification number of the electronic pen 12. The projector 22 projects a video (handwriting of the electronic pen 12) at the detected bright spot position, and thus drawing is performed (state Sf).

In the state Sf, in a case where the pen tip of the electronic pen 12 is separated from the white board 26, the switch 14 is turned off. Then, the electronic pen 12 transmits a BT event indicating switch off. Thereafter, the IR LED 13 continues to be turned on or blink, and positions of bright spots which are sequentially recognized are associated with the identification number of the electronic pen 12. Thus, tracking of the position of the electronic pen 12 is performed (state Sg).

Note that, in the states Sd, Sf, and Sg, in a case where the light emission recognition unit 32 of the information processing apparatus 10a cannot detect the bright spot position (in a case where the bright spot of the IR LED 13 is lost), the association between the bright spot position and the identification number of the electronic pen 12 is released, and the state transitions to the state Se.

[1-9. Description of Method of Reflecting Input Result of Electronic Pen]

Figure 14:
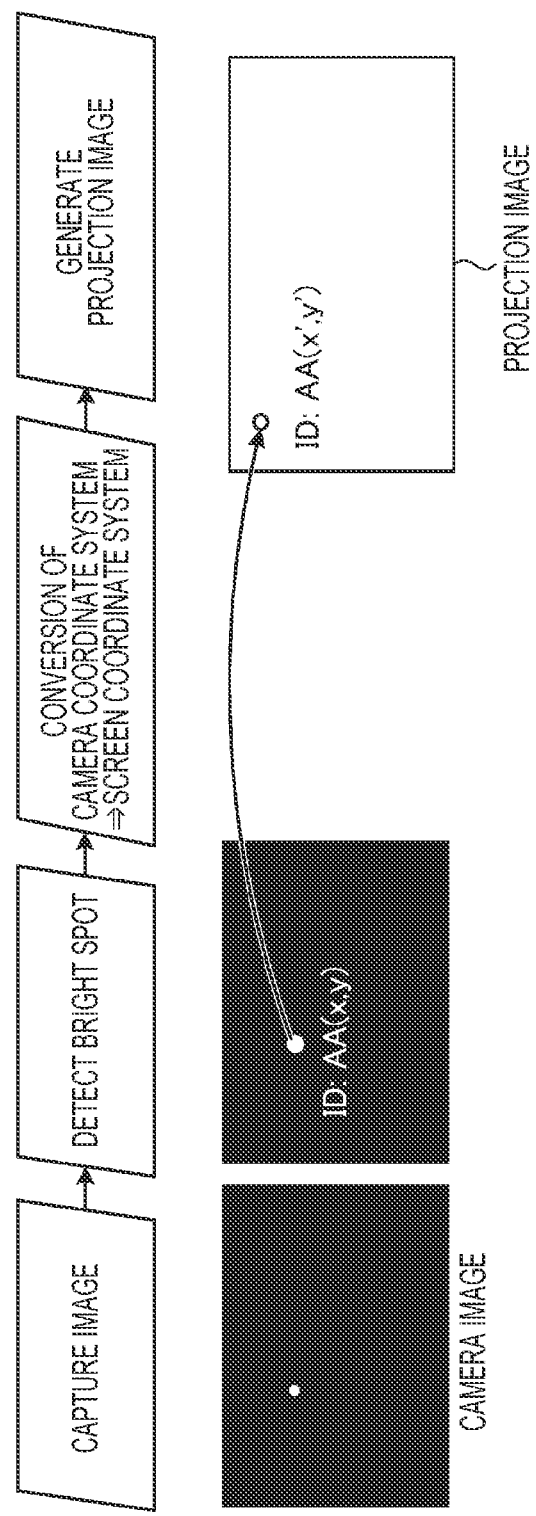
FIG. 14 is a diagram for explaining a flow of processing of converting a detected bright spot position in a camera coordinate system to a position in a projector screen coordinate system.

Next, a method of projecting an input result by the electronic pen 12 on the white board 26 by the projector 22, that is, a method of reflecting the input result of the electronic pen will be described with reference to FIG. 14. FIG. 14 is a diagram for explaining a flow of processing of converting the detected bright spot position in the camera coordinate system to a position in the projector screen coordinate system.

In a case where bright spot position detection and ID identification are performed and the switch 14 is turned on, the projector 22 reflects and projects information written by the electronic pen 12 onto the white board 26. This corresponds to a case where the state of the electronic pen 12 is the state Sf in FIG. 13.

Since a coordinate (x, y) of the detected bright spot position is in the camera coordinate system, as illustrated in FIG. 14, a coordinate in the camera coordinate system is converted to a coordinate in the screen coordinate system for projection by the projector 22 by multiplying the coordinate detected by the camera by a 2D-to-2D projection conversion matrix (Homography matrix). The converted coordinate (x', y') is reflected into an application, as an input coordinate.

[1-10. Effects of First Embodiment]

As described above, in the information processing apparatus 10a according to the first embodiment, the light emission control unit 34a turns on the IR LED 13 (light emission unit) included in the electronic pen 12 (operation body) in which communication with the information processing apparatus 10a is established, and in a case where another electronic pen 12 (operation body) approaches, causes the IR LED 13 included in the another electronic pen 12 to blink at timings different from each other. Then, the light emission recognition unit 32 (detection unit) detects a position according to the IR LED 13 included in each of the electronic pens 12 in association with the electronic pen 12. In a case where the electronic pen 12 is in an information input state, the input/output control unit 36 (display control unit) displays information associated with the electronic pen 12 at the position corresponding to the IR LED 13 that is detected by the light emission recognition unit 32.

With this configuration, even in a case where a plurality of electronic pens 12 approaches each other, a position corresponding to each of the electronic pens 12 can be identified, and thus it is possible to reliably detect the position.

Furthermore, in the information processing apparatus 10a according to the first embodiment, the light emission control unit 34a determines that the plurality of electronic pens 12 (operation bodies) approaches each other in a case where the positions according to the IR LEDs 13 (light emission units) that are detected by the light emission recognition unit 32 (detection unit) approach each other within the threshold distance d.

With this configuration, it is possible to recognize that the plurality of electronic pens 12 approaches each other, by simple processing.

Furthermore, in the information processing apparatus 10a according to the first embodiment, the light emission control unit 34a blinks the IR LEDs 13 (light emission units) of the electronic pens 12 at timings different from each other for each time exceeding at least a time required for image input, the time being obtained by dividing a predetermined time by the number of the electronic pens 12 (operation bodies) approaching each other within the threshold distance d.

With this configuration, the IR LEDs 13 of the plurality of electronic pens 12 approaching each other within the threshold distance d blink in a time-division manner, and thus it is possible to specify the position of the bright spot generated by the IR LED 13 of each of the electronic pens 12 at a timing when each of the electronic pens 12 is turned on. Therefore, it is possible to prevent exchange of the identification numbers (ID) assigned to each of the electronic pens 12.

Furthermore, in the information processing apparatus 10a according to the first embodiment, in a case where a bright spot position (a position according to the light emission unit of the operation body) by the IR LED 13 of another electronic pen 12 is detected within the threshold distance d from a bright spot position (a position according to the light emission unit of the operation body) by the IR LED 13 (light emission unit) of the electronic pen 12 (operation body) and where the electronic pen 12 and the another electronic pen 12 are both in an information input state, the light emission control unit 34a blinks the IR LED 13 of the electronic pen 12 and the IR LED 13 of the another electronic pen 12 at timings different from each other.

With this configuration, it is possible to prevent exchange of the IDs of the plurality of electronic pens 12 (operation bodies).

Furthermore, in the information processing apparatus 10a according to the first embodiment, in a case where a bright spot position (a position according to the light emission unit of the operation body) by the IR LED 13 of another electronic pen 12 is detected within the threshold distance d from a bright spot position (a position according to the light emission unit of the operation body) by the IR LED 13 (light emission unit) of the electronic pen 12 (operation body) and where the electronic pen 12 is in an information input state and the another electronic pen 12 is not in an information input state, the light emission control unit 34a turns on the IR LED 13 of the electronic pen 12 and turns off the IR LED 13 of the another electronic pen 12.

With this configuration, it is possible to reliably track the bright spot position by the IR LED 13 of the electronic pen 12 in an information input state, without lowering the frame rate.

Furthermore, in the information processing apparatus 10a according to the first embodiment, in a case where a bright spot position (a position according to the light emission unit of the operation body) by the IR LED 13 of another electronic pen 12 is detected within the threshold distance d from a bright spot position (a position according to the light emission unit of the operation body) by the IR LED 13 (light emission unit) of the electronic pen 12 (operation body) and where the electronic pen 12 is not in an information input state and the another electronic pen 12 is in an information input state, the light emission control unit 34a turns off the IR LED 13 of the electronic pen 12 and turns on the IR LED 13 of the another electronic pen 12.

With this configuration, it is possible to reliably track the bright spot position by the IR LED 13 of the electronic pen 12 that is in an information non-input state, without lowering the frame rate.

Furthermore, in the information processing apparatus 10a according to the first embodiment, in a case where a position according to the IR LED 13 of another electronic pen 12 is detected within the threshold distance d from a position according to the IR LED 13 (light emission unit) of the electronic pen 12 (operation body) and where the electronic pen 12 and the another electronic pen 12 are not both in an information input state, the light emission control unit 34a blinks the IR LED 13 of the electronic pen 12 and the IR LED 13 of the another electronic pen 12 at timings different from each other.

With this configuration, it is possible to continuously track the position of the electronic pen 12 that is not in an information input state.

2. Second Embodiment

In a case where a task performed by the electronic pen 12 is a simple task such as a button operation, as described in the first embodiment, a decrease in the frame rate in a case where each of the IR LEDs 13 is caused to blink in a time-division manner when a plurality of electronic pens 12 approaches each other is not a problem. On the other hand, in a case where the electronic pen 12 performs writing of a text or drawing of a picture, it is desirable to prevent a decrease in the frame rate as much as possible.

In order to cope with such a problem, the information processing apparatus 10b (not illustrated) according to a second embodiment of the present disclosure is an example in which a function of changing light emission control methods of the IR LEDs 13 in a case where a plurality of electronic pens 12 approaches each other within the threshold distance d according to content of a task being performed by the electronic pen 12 is added.

That is, in a case of blinking the IR LEDs 13 of the plurality of electronic pens 12 being in an information input state in a time-division manner, the information processing apparatus 10b changes a time-division rate for each of the electronic pens 12 according to a type of a task being performed by each of the electronic pens 12.

Specifically, in a case where the electronic pen 12 performs writing of a text or drawing of a picture, it is important to recognize a change in drawing position with an elapse of time. Thus, by turning on the IR LED 13 for a longer time, a decrease in the frame rate is reduced. On the other hand, in a case where the electronic pen 12 is used for applications such as a button operation, it is important to recognize an instantaneous position. Thus, even in a case where the frame rate is decreased, there is no problem. Therefore, the turn-on time of the IR LED 13 can be set to be short.

Therefore, the information processing apparatus 10b has a function of determining content of a task being performed by the electronic pen 12. The information processing apparatus 10b can determine the content of the task being performed, for example, by referring to operation content of an operation menu. Although not illustrated, for example, in a case where an operation menu projected on the white board 26 is selected by the electronic pen 12, the information processing apparatus 10b performs a selected operation. At that time, in a case where an operation menu such as "drawing" or "writing" is selected, information indicating a task type corresponding to "drawing" or "writing" is assigned to the identification number (ID) of the electronic pen 12 that selects the menu. On the other hand, in a case where an operation menu such as "button operation" is selected, information indicating a task type corresponding to "button operation" is assigned to the identification number (ID) of the electronic pen 12 that selects the menu.

Then, in a case where it is determined that the plurality of electronic pens 12 approaches each other within the threshold distance d by the ID exchange prevention determination processing (FIG. 12), the light emission control unit 34a time-divides a recognition period t0 (predetermined time) illustrated in FIG. 10 and FIG. 11 according to the information indicating the task type assigned to the approaching electronic pen 12.

As described above, in the information processing apparatus 10b according to the second embodiment, the light emission control unit 34a controls a ratio of the turn-on time of the IR LED 13 (light emission unit) of each of the electronic pens 12 within the recognition period t0 (predetermined time) according to the content of the task being performed by the electronic pen (operation body).

Thereby, for example, in a case where writing of a text or drawing of a picture is performed, the turn-on time of the IR LED 13 when turning on the IR LED 13 in a time-division manner can be set to be long, and in a case where an operation instruction such as a button operation is performed, the turn-on time of the IR LED 13 when turning on the IR LED 13 in a time-division manner can be set to be short. Therefore, in a case where a task requiring tracking of a drawing position is performed, a decrease in the frame rate can be reduced.

3. Third Embodiment

As illustrated in FIG. 1, in a case where a plurality of operators possess the electronic pens 12 and perform writing on the same white board 26, the plurality of the electronic pens 12 may approach each other within the threshold distance d for a time for which the operators are not aware of the approach. In such a case, before the ID exchange prevention determination processing is performed, it is desirable to warn the operator of the approach of the electronic pen 12.

In order to cope with such a problem, the information processing apparatus 10*c* (not illustrated) according to a third embodiment of the present disclosure is an example in which a function of prompting an operator of the electronic pen 12 to separate the electronic pen 12 in a case where the plurality of electronic pens 12 approaches each other within the threshold distance d is added to the information processing apparatus 10*a* described in the first embodiment.

Specifically, in a case where the light emission control unit 34*a* determines that the plurality of electronic pens 12 approaches each other within the threshold distance d, the input/output control unit 36 may instruct the projector 22 to project information in a form in which a handwriting drawn by the approaching electronic pen 12 blinks. Furthermore, by vibrating vibration means such as a vibrator incorporated in the electronic pen 12, an operator of the electronic pen 12 may be notified of a fact that another electronic pen 12 is approaching.

As described above, in the information processing apparatus 10*c* according to the third embodiment, in a case where a bright spot position (a position according to the light emission unit of the operation body) by the IR LED 13 (light emission unit) of another electronic pen 12 (operation body) approaches within the threshold distance d, the input/output control unit 36 (display control unit) causes the projector 22 to display information prompting the operator to separate the electronic pen 12.

Thereby, it possible to intuitively notify the operator of a fact that another electronic pen 12 is approaching.

4. Fourth Embodiment

In each of the above embodiments, in the determination as to whether or not the plurality of electronic pens 12 approaches each other, the threshold distance d as a preset fixed value is used. Therefore, in a case where the electronic pen 12 moves quickly, it may be difficult to detect a state where the plurality of electronic pens 12 approaches each other within the threshold distance d.

In order to cope with such a problem, the information processing apparatus 10*d* (not illustrated) according to a fourth embodiment of the present disclosure is an example in which a function of changing the threshold distance d used for determining whether or not a plurality of electronic pens 12 approaches each other according to a moving speed and a moving direction of the electronic pen 12 is included.

Specifically, the information processing apparatus 10*d* continuously performs monitoring of the moving speed of each of the electronic pens 12, and increases the threshold distance d in a case where the moving speed of the electronic pen 12 is high or acceleration of the electronic pen 12 increases. That is, the bright spot position moves along the handwriting of the electronic pen 12, while constantly changing a size of a circular area which has a radius of d/2 and in which the bright spot position detected by the light emission recognition unit 32 is set as a center. Then, in a case where a bright spot position by another electronic pen 12 enters the circular area having a radius of d/2, the light emission control unit 34*a* determines that the another electronic pen 12 approaches.

Note that the threshold distance d may be changed in consideration of movement of electronic pens 12 close to the electronic pen 12. That is, in a case where two electronic pens 12 move in a direction of being closer to each other, the threshold distance d may be changed to be longer. Furthermore, in a case where two electronic pens 12 move in a direction of being separated from each other, the threshold distance d may be changed to be shorter.

That is, the information processing apparatus 10*d* continuously performs monitoring of the moving speed and the moving direction of each of the electronic pens 12, and sets a circular area which has a radius of d/2 and in which each bright spot position is set as a center each time.

As described above, in the information processing apparatus 10*d* according to the fourth embodiment, the threshold distance d is set on the basis of the moving speed or the moving direction of the electronic pen 12 (operation body).

Thereby, it is possible to appropriately set the threshold distance d according to a situation where the electronic pen 12 is used. Therefore, it is possible to further improve robustness of ID exchange prevention determination processing.

5. Fifth Embodiment

The information processing apparatus 10*e* (not illustrated) according to a fifth embodiment of the present disclosure is an example in which a function of forming a plurality of groups including a plurality of electronic pens 12 approaching within the threshold distance d and corresponding to a case where each group includes the same electronic pen 12 is included.

Figure 15:
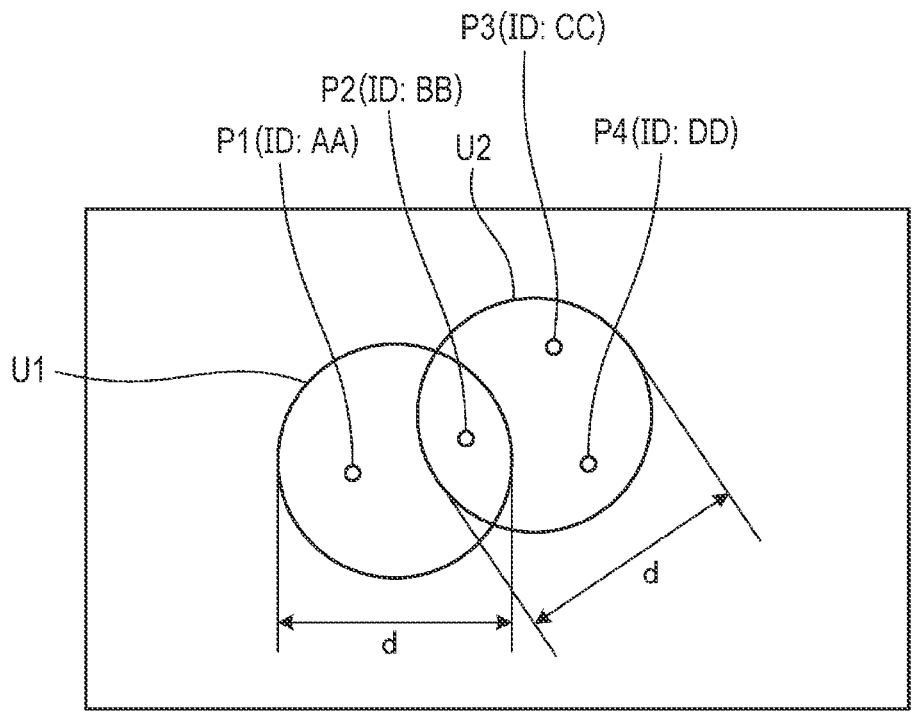
FIG. 15 is a diagram illustrating an example of a state where parts of groups including a plurality of electronic pens approaching each other within a threshold distance are overlapped.

FIG. 15 is a diagram illustrating an example of a state where parts of groups including a plurality of electronic pens approaching within a threshold distance are overlapped. As illustrated in FIG. 15, it is assumed that a bright spot P1 by the electronic pen 12 having an identification number "AA" and a bright spot P2 by the electronic pen 12 having an identification number "BB" approach each other within a threshold distance d. Then, it is further assumed that a bright spot P2 by the electronic pen 12 having an identification number "BB", a bright spot P3 by the electronic pen 12 having an identification number "CC", and a bright spot P4 by the electronic pen 12 having an identification number "DD" approach each other within the threshold distance d. That is, it is assumed that the bright spots P1 and P2 by the electronic pens 12 having identification numbers "AA" and "BB" belong to a group U1 and the bright spots P2, P3, and P4 by the electronic pens 12 having identification numbers "BB", "CC", and "DD" belong to a group U2.

Figure 16:
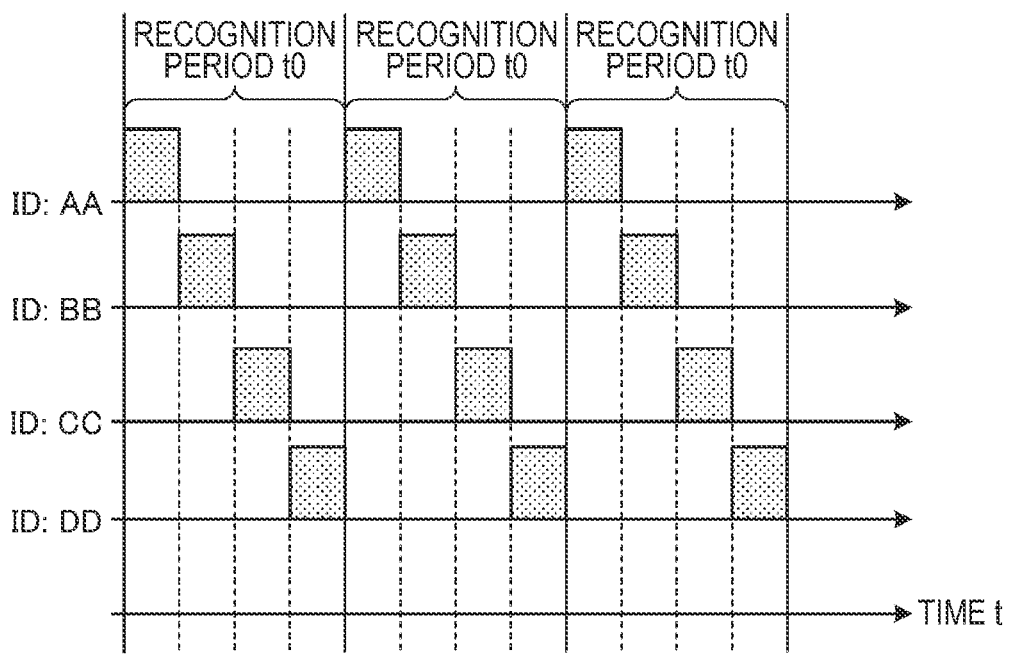
FIG. 16 is a time chart illustrating an example of turning on IR LEDs of all the electronic pens belonging to a union in a time-division manner.

In such a case, the light emission control unit 34*a* may blink the IR LEDs 13 of four electronic pens 12 belonging to a union (U1∪U2) of the group U1 and the group U2 in a time-division manner (refer to FIG. 16). Furthermore, the light emission control unit 34*a* may blink the IR LEDs 13 of the electronic pens 12 belonging to the group U1 such that turn-on periods do not overlap with each other, and may blink the IR LEDs 13 of the electronic pens 12 belonging to the group U2 such that turn-on periods do not overlap with each other. That is, the IR LEDs 13 of the electronic pens 12 belonging to different groups, for example, the IR LED 13 of the electronic pen 12 belonging to the group U1 and having the identification number "AA" and the IR LED 13 of the electronic pen 12 belonging to the group U2 and having the identification number "DD" may blink at the same timing (refer to FIG. 17). Alternatively, the IR LED 13 of the electronic pen 12 belonging to the group U1 and having the identification number "AA" and the IR LED 13 of the electronic pen 12 belonging to the group U2 and having the identification number "CC" may blink at the same timing.

FIG. 16 is a time chart illustrating an example of turning on the IR LEDs of all the electronic pens belonging to a union in a time-division manner.

As illustrated in FIG. 16, by blinking the IR LEDs 13 of the four electronic pens 12 belonging to the union (U1∪U2) of the group U1 and the group U2 at timings obtained by dividing the recognition period t0 into four, it is possible to reliably specify the positions according to all the electronic pens 12 belonging to the union.

Figure 17:
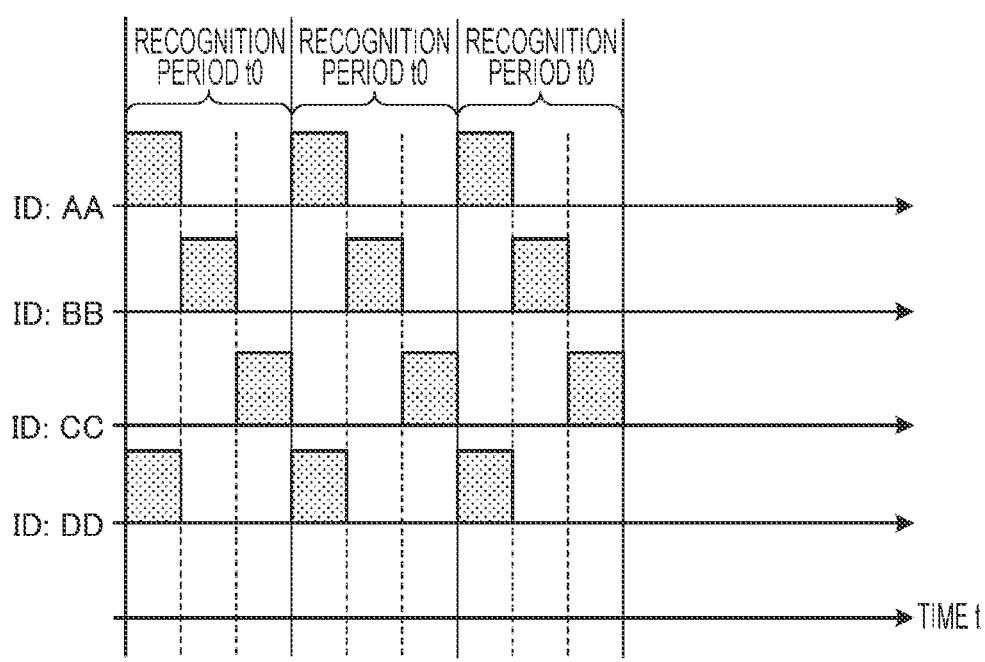
FIG. 17 is a time chart illustrating an example of blinking the IR LEDs of the electronic pens such that light emission patterns do not overlap with each other in each group.

FIG. 17 is a time chart illustrating an example of blinking the IR LEDs of the electronic pens such that light emission patterns do not overlap with each other in each group.

As illustrated in FIG. 17, the IR LED 13 of the electronic pen 12 belonging to the group U1 and having the identification number "AA" and the IR LED 13 of the electronic pen 12 belonging to the group U2 and having the identification number "DD" blink at the same timing. Thereby, the IR LEDs 13 of two electronic pens 12 belonging to the group U1 blink at timings different from each other, and thus the information processing apparatus 10e can reliably specify the bright spot position by the IR LED 13 of each of the electronic pens 12 belonging to the group U1. Furthermore, the IR LEDs 13 of three electronic pens 12 belonging to the group U2 blink at timings different from each other, and thus the information processing apparatus 10e can reliably specify the bright spot position by the IR LED 13 of each of the electronic pens 12 belonging to the group U2.

As described above, in the information processing apparatus 10e according to the fifth embodiment, in a case where the bright spot positions (positions according to the light emission units of the operation bodies) by the IR LEDs 13 (light emission units) of the electronic pens 12 (operation bodies) and the bright spot positions by the IR LEDs 13 of the plurality of electronic pens 12 different from the electronic pens 12 approach each other within the threshold distance d and where the positions according to the IR LEDs 13 of the plurality of electronic pens 12 different from the electronic pens 12 include a position separated farther than the threshold distance d, the light emission control unit 34a blinks the IR LEDs 13 of all the electronic pens 12 approaching each other within the threshold distance d from the positions according to the IR LEDs 13 of the electronic pens 12, at timings different from each other.

Thereby, even in a case where the bright spot positions by the plurality of other electronic pens 12 are observed within the threshold distance d from the bright spot positions by the IR LEDs 13 (light emission units) of the electronic pens 12 (operation bodies) and where the bright spot positions by the plurality of other electronic pens 12 include a bright spot position separated farther than the threshold distance d, it is possible to reliably specify the bright spot position by the IR LED 13 of each of the electronic pens 12.

Furthermore, in the information processing apparatus 10e according to the fifth embodiment, in a case where the bright spot positions (positions according to the light emission units of the operation bodies) by the IR LEDs 13 (light emission units) of the electronic pens 12 (operation bodies) and the bright spot positions by the IR LEDs 13 of the plurality of electronic pens 12 different from the electronic pens 12 approach each other within the threshold distance d and where the positions according to the IR LEDs 13 of the plurality of electronic pens 12 different from the electronic pens 12 include a position separated farther than the threshold distance d, the light emission control unit 34a blinks at least the IR LEDs 13 related to the bright spot positions approaching each other within the threshold distance d, at timings different from each other.

Thereby, even in a case where the bright spot positions by the plurality of other electronic pens 12 are observed within the threshold distance d from the bright spot positions by the IR LEDs 13 (light emission units) of the electronic pens 12 (operation bodies) and where the bright spot positions by the plurality of other electronic pens 12 include a bright spot position separated farther than the threshold distance d, it is possible to reliably specify the bright spot position by the IR LED 13 of each of the electronic pens 12. Furthermore, a decrease in the frame rate can be reduced.

6. Application Example (1) of Present Disclosure

Here, application examples of the present disclosure will be described. The present disclosure can also be applied to information input devices other than the electronic pen 12. That is, in a case where a controller type device having both a function of detecting a position from a sensor such as a camera and a communication function is available in a certain space, the device can be treated as an input device similarly to the electronic pen 12 described in each of the above embodiments. In each of the above embodiments, the switch 14 is incorporated in order to detect an input state of the electronic pen 12. On the other hand, the switch 14 is not necessarily required as long as position detection and ID identification of a target device can be performed.

Figure 18:
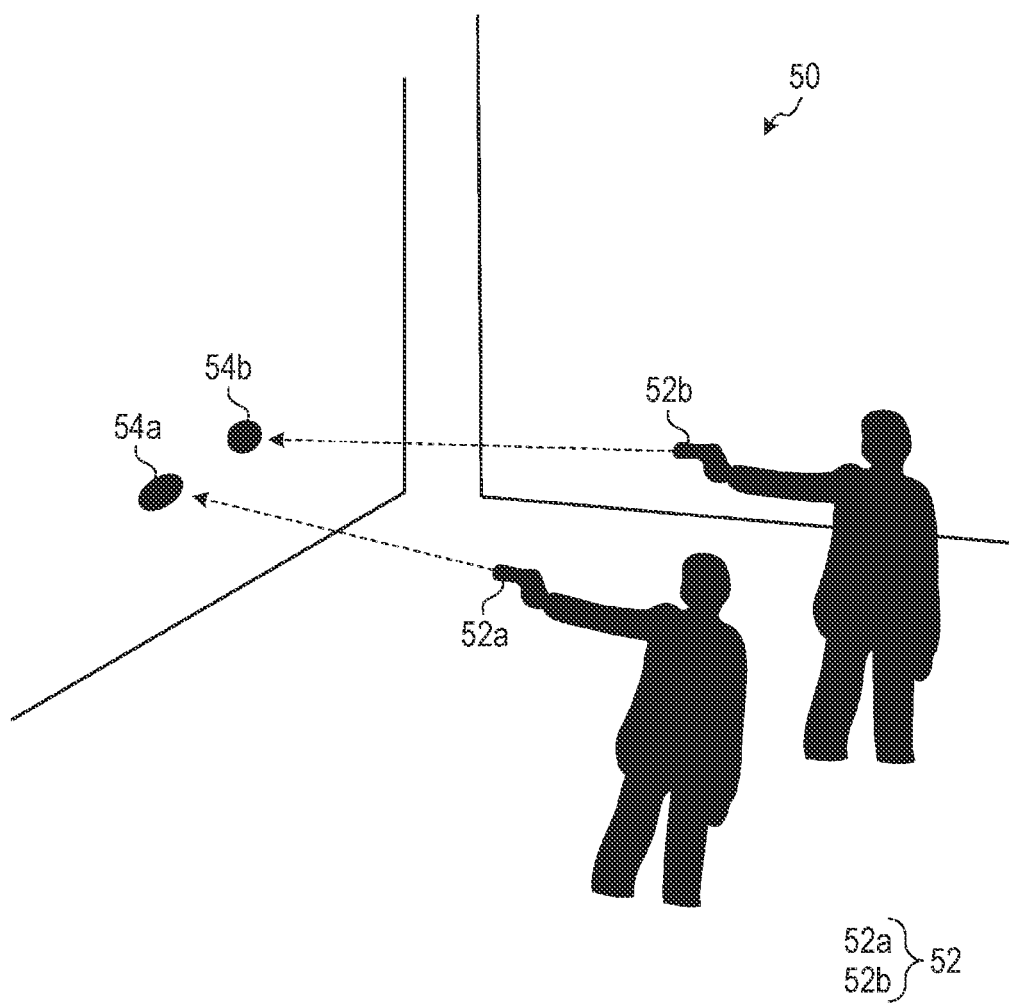
FIG. 18 is a schematic diagram of a shooting system as an application example of the present disclosure.

FIG. 18 is a schematic diagram of a shooting system as an application example of the present disclosure. In the shooting system 50, a user can shoot an object (for example, an enemy character) displayed on a wall surface by using a gun-type controller 52 (52a, 52b) held by the user himself/herself, the gun-type controller being an example of an operation body according to the present disclosure. In such a game application, an IR LED having a high directivity is mounted in the gun-type controller 52, and a camera observes a wall surface irradiated with light emitted from the IR LED. Thereby, content of the present disclosure can be applied. Even in a case where a plurality of users points the guns at adjacent places or the same place, that is, even in a case where bright spots 54a and 54b observed from the camera are observed at the same place, the bright spots by irradiation of light emitted from the guns can be identified from each other.

7. Application Example (2) of Present Disclosure

Figure 19:
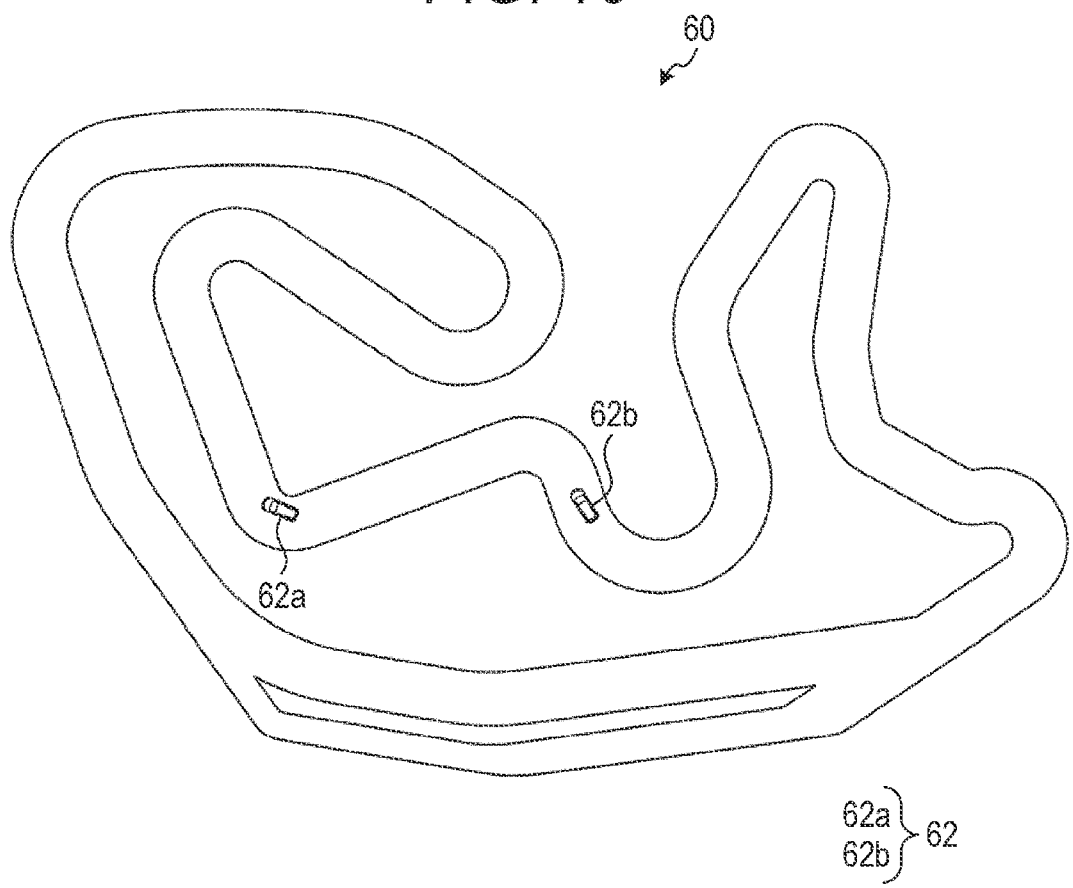
FIG. 19 is a first diagram illustrating an outline of a mini car driving competition system as an application example of the present disclosure.
Figure 20:
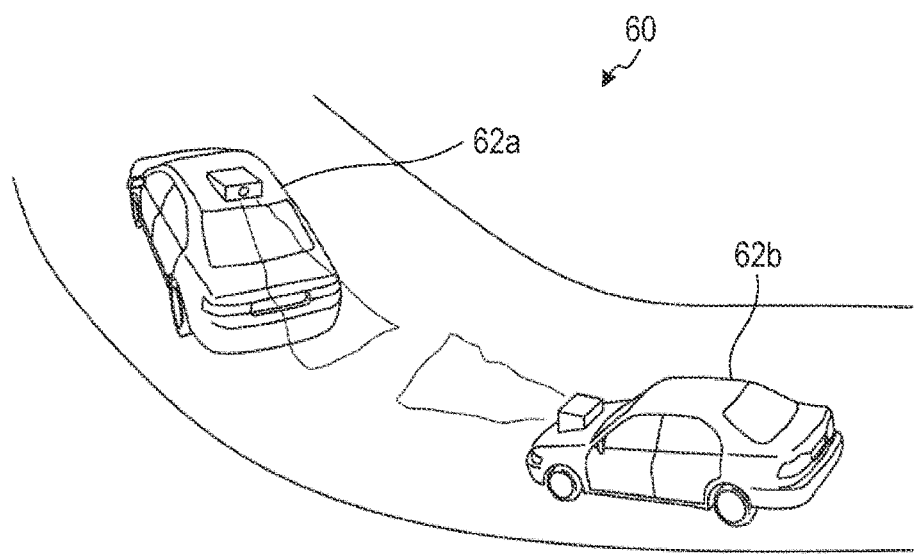
FIG. 20 is a second diagram illustrating an outline of a mini car driving competition system as an application example of the present disclosure.

FIG. 19 is a first diagram illustrating an outline of a mini car driving competition system as an application example of the present disclosure. FIG. 20 is a second diagram illustrating an outline of a mini car driving competition system as an application example of the present disclosure. This example is an example in which the present disclosure is applied to a racing system 60 that performs driving competition by using a mini car such as a mini four-wheel drive (registered trademark) or a radio-controlled car. An IR LED and a communication module are provided in a car 62 (62a, 62b) which is an example of an operation body according to the present disclosure, and a camera for detecting the IR LED (for example, a camera that captures an image of a road on which the car travels in a bird's-eye view manner) is provided. Thereby, a plurality of cars 62 can be identified from each other. In such a case, even in a scene where the cars approach each other, the cars can be identified from each other in the present invention. By applying the present disclosure, it is possible to perform a performance to which a visual effect is added by projecting information at a position of the car 62 in real time. Furthermore, since positions of the plurality of cars 62 are known, by providing a front projection type projector in the car 62, as illustrated in FIG. 20, effects such as an attack effect and a power-up effect on the other cars can be produced by a display video obtained by the front projection type projector.

8. Application Example (3) of Present Disclosure

Figure 21:
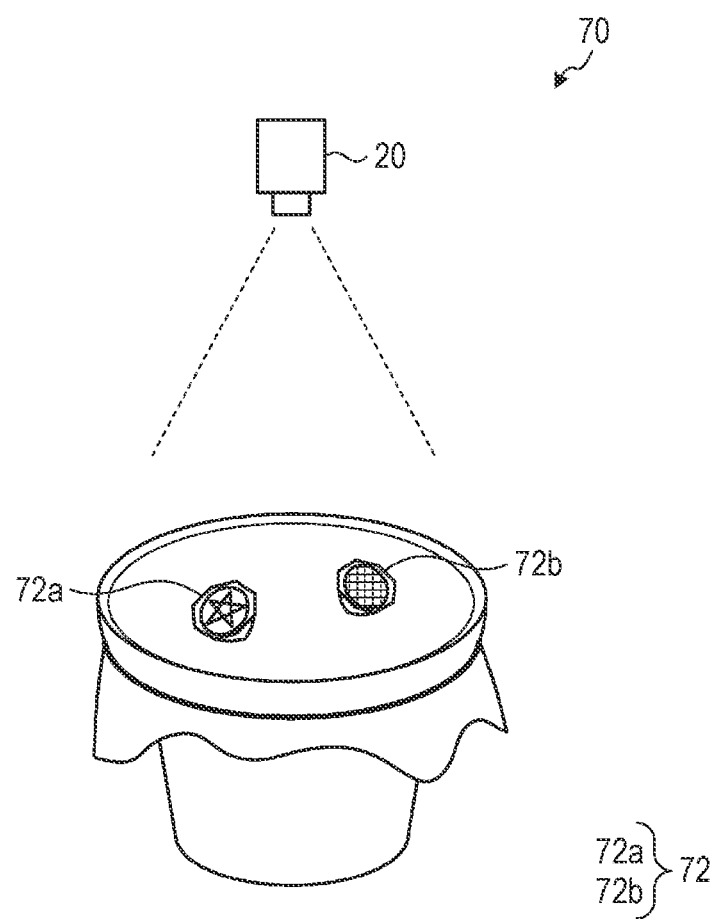
FIG. 21 is a diagram illustrating an outline of a spinning top competition system as an application example of the present disclosure.

FIG. 21 is a diagram illustrating an outline of a spinning top competition system as an application example of the present disclosure. The present example is an example in which the present disclosure is applied to a spinning top competition system 70. By providing an IR LED and a communication module in a spinning top 72 (72a, 72b) which is an example of the operation body according to the present disclosure, a camera 20 can identify a plurality of spinning tops. Furthermore, the spinning tops can be identified even in a case where the spinning tops 72 collide with each other or approach each other in a battle on a stage. By applying the present disclosure, it is also possible to perform a performance to which a visual effect such as projection mapping is added at a detected position of the spinning top 72 or at a timing when the spinning tops 72 collide with each other.

9. Application Example (4) of Present Disclosure

Figure 22:
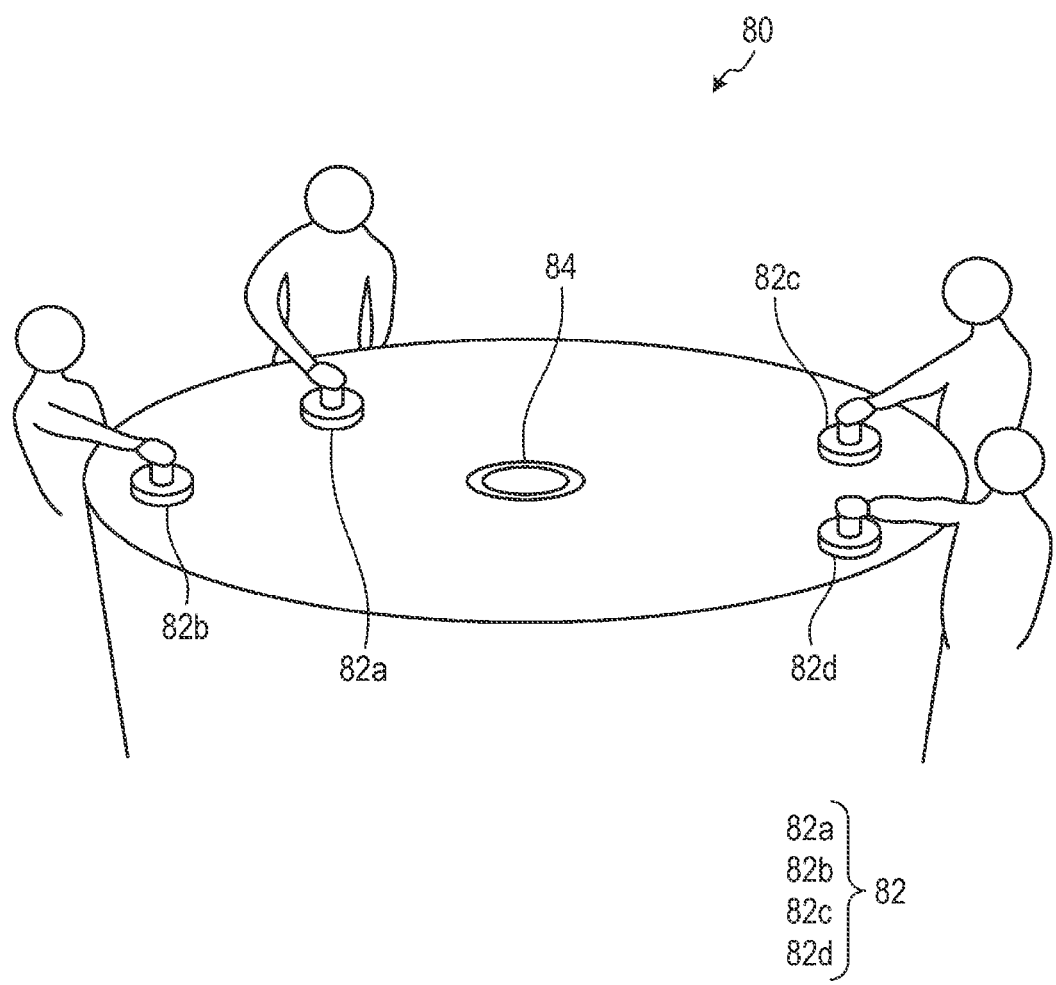
FIG. 22 is a diagram illustrating an outline of an air hockey system as an application example of the present disclosure.

FIG. 22 is a diagram illustrating an outline of an air hockey system as an application example of the present disclosure. The present example is an example in which the present disclosure is applied to an air hockey system 80. In this application example, by providing an IR LED and a communication module in a mallet 82 (82a, 82b) gripped by a user, the mallet being an example of an operation body according to the present disclosure, the mallet 82 of the user can be identified. When users play together, other mallets 82 may approach. In such a case, by applying the present disclosure, it is possible to identify each of the mallets 82. Furthermore, by providing similar mechanisms to a pack, it is also possible to identify a plurality of packs. Moreover, by detecting positions of the pack and the mallet, it is possible to perform a performance to which a visual effect is added, or to perform a performance according to an event obtained by performing collision determination between the pack and the mallet. Furthermore, it is also possible to apply projected virtual packs to a game such as a hitting game.

10. Application Example (5) of Present Disclosure

Figure 23:
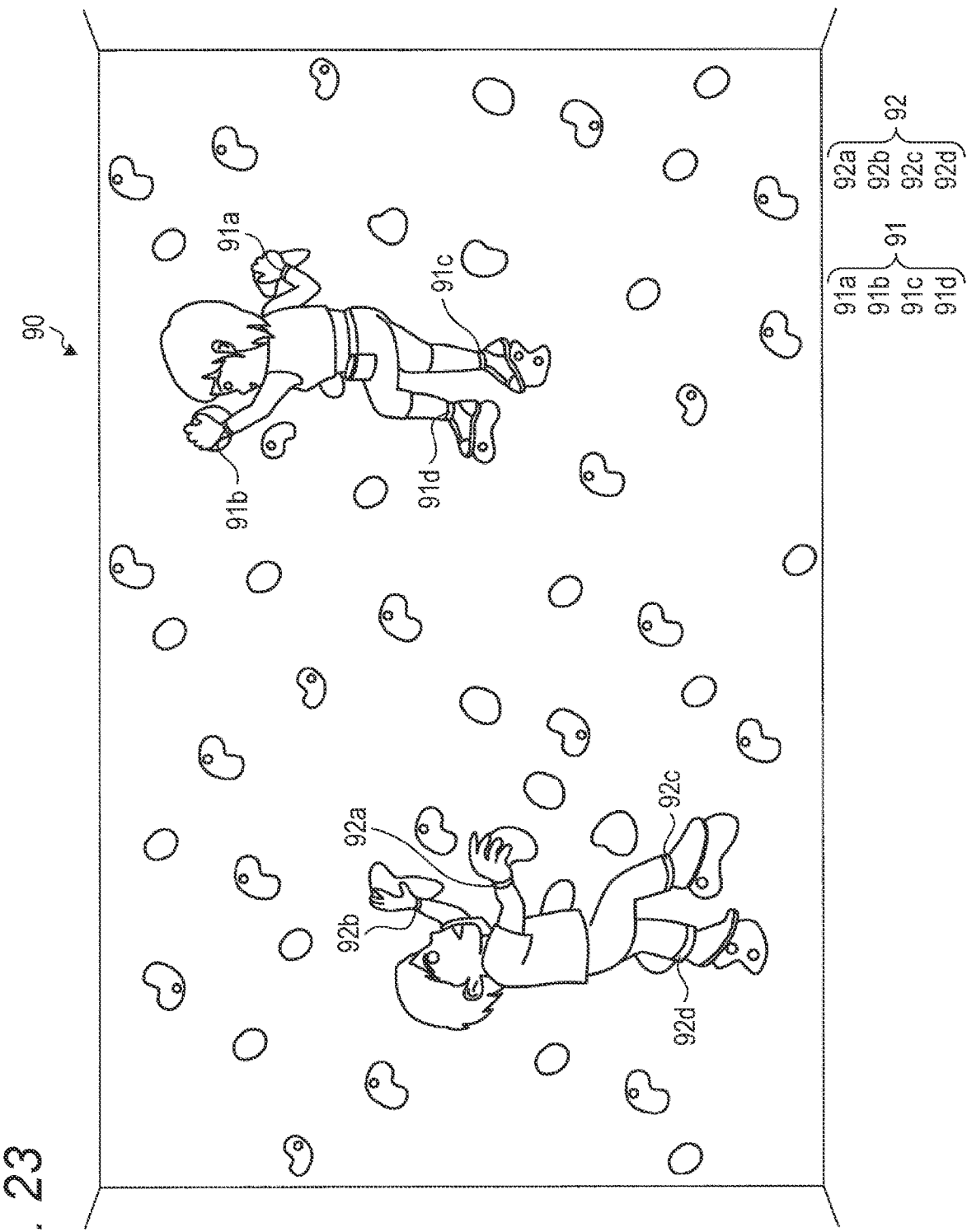
FIG. 23 is a diagram illustrating an outline of a bouldering system as an application example of the present disclosure.

FIG. 23 is a diagram illustrating an outline of a bouldering system as an application example of the present disclosure. This example is an application example of a bouldering system 90 in which positions of hands and feet of a user can be detected in a case where the user wears devices 91 and 92 on his/her hands and feet, the devices being an example of the operation body according to the present disclosure. Note that an IR LED and a communication module are provided in the devices 91 and 92. Specifically, one user wears the devices 91a, 91b, 91c, and 91d on each of the right hand, the left hand, the right foot, and the left foot. Another user wears the devices 92a, 92b, 92c, and 92d on each of the right hand, the left hand, the right foot, and the left foot.

In FIG. 23, the users wearing the devices 91 and 92 are playing bouldering. At this time, since the positions of the hands and the feet of the user are known from positions of the devices 91 and 92 detected by a camera (not illustrated), the bouldering system 90 can recognize a hold used by the user and produce an effect according to a result of the hold. According to the present invention, even in a case where the IR LEDs attached to the hands and the feet of the user overlap with each other due to movement of the user when viewed from the camera, it is possible to identify and detect each of the devices 91 and 92. Furthermore, a plurality of users may be identified, and a place where each user climbs may be identified as in a battle game. In this case, by grouping the devices to be used by each user in advance (for example, grouping IDs of four devices to be attached to the right hand, the left hand, the right foot, and the left foot), it is possible to identify user information and detected parts.

11. Application Example (6) of Present Disclosure

Figure 24:
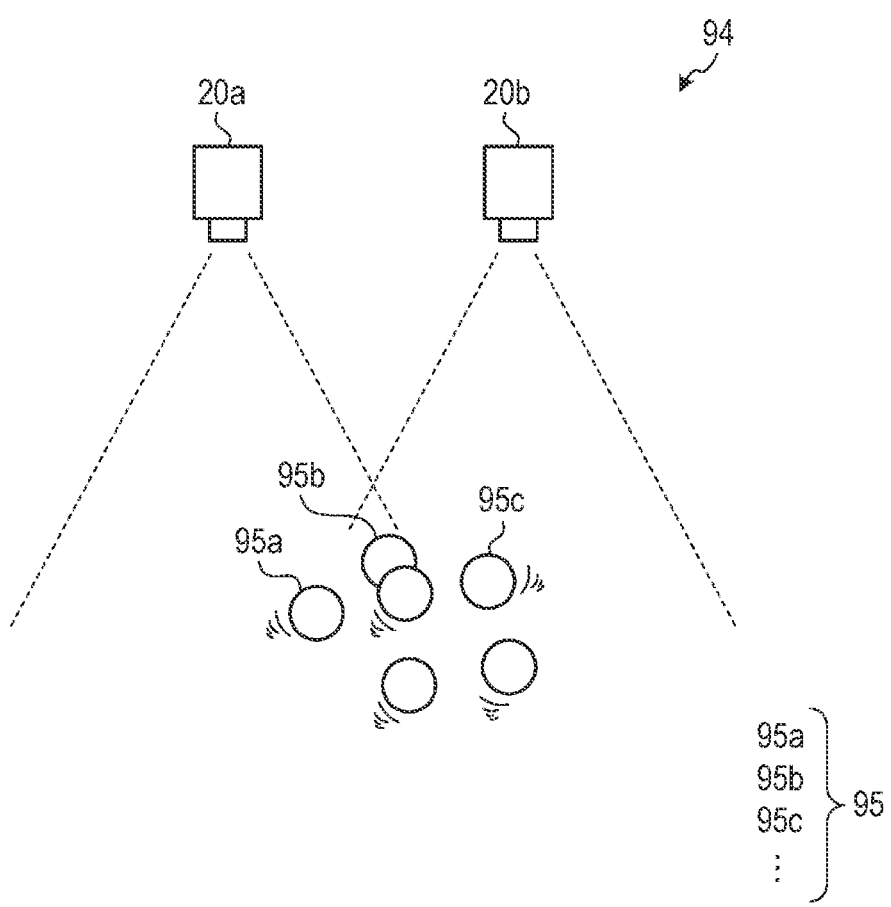
FIG. 24 is a diagram illustrating an outline of a group robot control system as an application example of the present disclosure.

FIG. 24 is a diagram illustrating an outline of a group robot control system as an application example of the present disclosure. A group robot control system 94 performs position detection of a plurality of robots 95 (95a, 95b, 95c, . . . ) having the same form by a plurality of cameras 20a and 20b provided above and facing downward, and performs action control of each robot, the robots being an example of an operation body according to the present disclosure. An IR LED that upwardly emits light is provided in each robot 95, and the cameras 20a and 20b detect a bright spot position by the IR LED. Thereby, the current position of each robot 95 is detected.

In the example of FIG. 24, for the robots 95 having the same form and called a group robot, position detection and ID identification of each robot 95 are performed using content of the present disclosure. Therefore, even in a case where the plurality of robots 95 is densely located, that is, in a state where the IR LEDs provided in each of the robots 95 approach each other, it is possible to identify and track the position of each of the robots 95. Such a group robot control system 94 may be applied to another apparatus such as a drone, or may be applied to a living thing such as a human.

12. Application Example (7) of Present Disclosure

Figure 25:
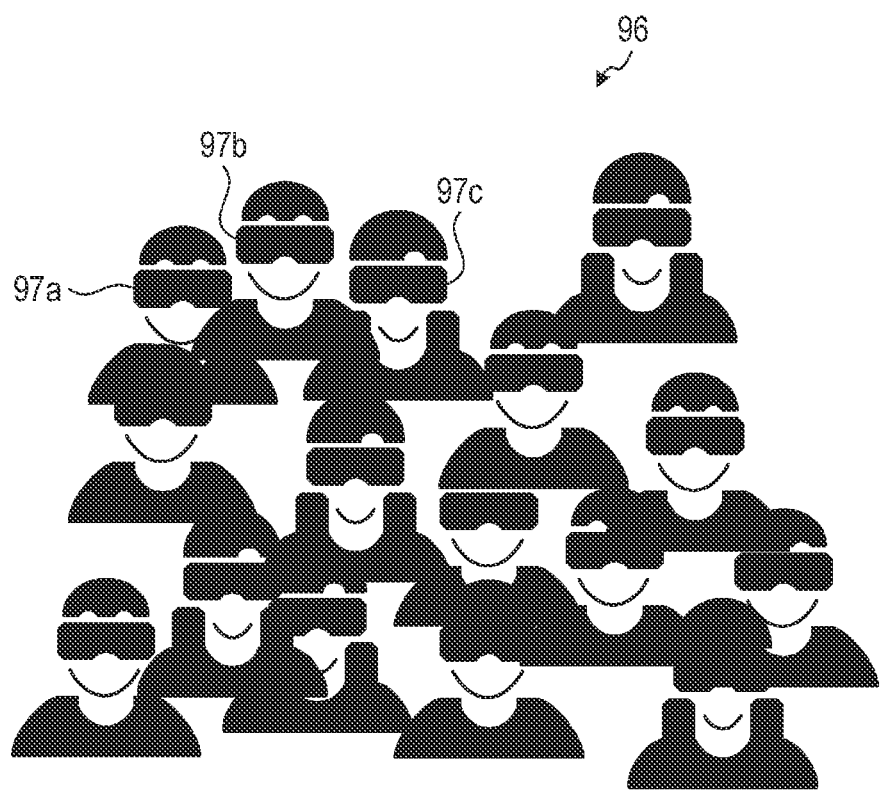
FIG. 25 is a diagram illustrating an outline of an AR/VR application system as an application example of the present disclosure.

FIG. 25 is a diagram illustrating an outline of an AR/VR application system as an application example of the present disclosure. The content of the present disclosure may be applied to position detection of a device worn by a user and represented by a head mount display (HMD). Specifically, as illustrated in FIG. 25, by providing an IR LED and a communication module in an HMD 97 (97a, 97b, 97c, . . . ) which is an example of an operation body according to the present disclosure, it is possible to identify a position of each user and an ID (user ID) assigned to the HMD 97 in a scene where a plurality of users wears the HMDs 97 in the same space. Thereby, for example, it is possible to reflect a position of the user who experiences a virtual space to a position of the real world. Furthermore, in order to prevent a collision between the users, it is possible to warn a user close to another user that the user may come in contact with another user.

Note that the effects described in the present specification are merely examples and are not limited thereto and other effects may be obtained. Furthermore, the embodiments of the present disclosure are not limited to the above-described embodiments, and various modifications can be made without departing from the gist of the present disclosure.

For example, the present disclosure can also have the following configurations.

(1)
An information processing apparatus including:
a light emission control unit that turns on light emission units included in operation bodies for which communication with the information processing apparatus is established and blinks the light emission units included in the operation bodies at timings different from each other in a case where another operation body approaches;
a detection unit that detects a position according to the light emission unit included in each of the operation bodies in association with the operation body; and
a display control unit that displays information associated with the operation body at a position corresponding to the light emission unit detected by the detection unit in a case where the operation body is in an information input state.

(2)
The information processing apparatus according to (1), in which the light emission control unit determines that a plurality of the operation bodies approaches each other in a case where the positions according to the light emission units detected by the detection unit approach each other within a threshold distance.

(3)
The information processing apparatus according to (2), in which the light emission control unit blinks the light emission units of the operation bodies at timings different from each other for each time exceeding at least a time required for image input, the time being obtained by dividing a predetermined time by the number of the operation bodies approaching each other within the threshold distance.

(4)
The information processing apparatus according to (2) or (3),
in which, in a case where a position according to a light emission unit of another operation body is detected within the threshold distance from a position according to the light emission unit of the operation body and where the operation body and the another operation body are both in an information input state,
the light emission control unit blinks the light emission unit of the operation body and the light emission unit of the another operation body at timings different from each other.

(5)
The information processing apparatus according to any one of (2) to (4),
in which, in a case where a position according to a light emission unit of another operation body is detected within the threshold distance from a position according to the light emission unit of the operation body and where the operation body is in an information input state and the another operation body is not in an information input state,
the light emission control unit turns on the light emission unit of the operation body and turns off the light emission unit of the another operation body.

(6)
The information processing apparatus according to any one of (2) to (5),
in which, in a case where a position according to a light emission unit of another operation body is detected within the threshold distance from a position according to the light emission unit of the operation body and where the operation body is not in an information input state and the another operation body is in an information input state,
the light emission control unit turns off the light emission unit of the operation body and turns on the light emission unit of the another operation body.

(7)
The information processing apparatus according to any one of (2) to (6),
in which, in a case where a position according to a light emission unit of another operation body is detected within the threshold distance from a position according to the light emission unit of the operation body and where the operation body and the another operation body are not both in an information input state,
the light emission control unit blinks the light emission unit of the operation body and the light emission unit of the another operation body at timings different from each other.

(8)
The information processing apparatus according to (3),
in which the light emission control unit controls a ratio of a turn-on time of the light emission unit of each of the operation bodies within the predetermined time according to content of a task being executed by the operation body.

(9)
The information processing apparatus according to any one of (2) to (8),
in which, in a case where a position according to a light emission unit of another operation body approaches within the threshold distance, the display control unit displays information prompting separation of the operation body.

(10)
The information processing apparatus according to any one of (2) to (9),
in which the threshold distance is set on the basis of a moving speed or a moving direction of the operation body.

(11)
The information processing apparatus according to any one of (2) to (10),
in which, in a case where the positions according to the light emission units of the operation bodies and positions according to the light emission units of a plurality of other operation bodies different from the operation bodies approach each other within the threshold distance and where the positions according to the light emission units of the plurality of other operation bodies include a position separated farther than the threshold distance,
the light emission control unit blinks the light emission units of all the operation bodies approaching each other within the threshold distance from the positions according to the light emission units of the operation bodies at timings different from each other.

(12)

The information processing apparatus according to any one of (2) to (10), in which, in a case where the positions according to the light emission units of the operation bodies and positions according to the light emission units of a plurality of other operation bodies different from the operation bodies approach each other within the threshold distance and where the positions according to the light emission units of the plurality of other operation bodies include a position separated farther than the threshold distance, the light emission control unit blinks at least the light emission units related to the positions approaching each other within the threshold distance at timings different from each other.

(13)

An information processing method including:

a light emission control process of turning on light emission units included in operation bodies for which communication with an information processing apparatus is established and blinking the light emission units included in the operation bodies at timings different from each other in a case where another operation body approaches;

a detection process of detecting a position of the light emission unit included in each of the operation bodies in association with the operation body; and a display control process of displaying information associated with the operation body at a position corresponding to the light emission unit detected by the detection process in a case where the operation body is in an information input state.

(14)

A program causing a computer to function as:

a light emission control unit that turns on light emission units included in operation bodies for which communication with an information processing apparatus is established and blinks the light emission units included in the operation bodies at timings different from each other in a case where another operation body approaches;

a detection unit that detects a position of the light emission unit included in each of the operation bodies in association with the operation body; and a display control unit that displays information associated with the operation body at a position corresponding to the light emission unit detected by the detection unit in a case where the operation body is in an information input state.

REFERENCE SIGNS LIST

5a Interactive projector
10a, 10b, 10c, 10d, 10e Information processing apparatus
12, 12a, 12b, 12c Electronic pen (operation body)
13 IR LED (light emission unit)
14 Switch
20 Camera
22 Projector
26 White board
32 Light emission recognition unit (detection unit)
34a Light emission control unit
36 Input/output control unit (display control unit)
d Threshold distance
t0 Recognition period (predetermined time)

The invention claimed is:

1. An information processing apparatus, comprising:
circuitry configured to:
control a first plurality of light emission devices of a first plurality of operation bodies to turn on, wherein
the information processing apparatus is communicably coupled to the first plurality of operation bodies, and
the first plurality of light emission devices includes:
a first light emission device of a first operation body of the first plurality of operation bodies, and
a second light emission device of a second operation body of the first plurality of operation bodies;
control, in a case where the second light emission device approaches the first light emission device, each of the first light emission device to blink at a first timing and the second light emission device to blink at a second timing, wherein
the second timing is different from the first timing;
detect each of:
a position corresponding to the first light emission device, of the first operation body, in association with the first operation body, and
a position corresponding to the second light emission device in association with the second operation body; and
display information associated with the first operation body at the position corresponding to the first light emission device in a case where the first operation body is in an information input state.

2. The information processing apparatus according to claim 1, wherein the circuitry is further configured to determine, in a case where the position corresponding to the first light emission device approaches the position corresponding to the second light emission device within a threshold distance, that the first operation body approaches the second operation body and the second operation body approaches the first operation body.

3. The information processing apparatus according to claim 2, wherein
the circuitry is further configured to control the first plurality of light emission devices to blink at different timings for each time that exceeds at least a time required for an image input operation, and
the time is obtained by division of a specific time by a number of the first plurality of operation bodies that approach each other within the threshold distance.

4. The information processing apparatus according to claim 2, wherein
in a case where the position corresponding to the second light emission device of the second operation body is within the threshold distance from the position corresponding to the first light emission device of the first operation body and in a case where the first operation body and the second operation body are both in the information input state, the circuitry is further configured to:
control the first light emission device of the first operation body to blink at the first timing; and
control the second light emission device of the second operation body to blink at the second timing.

5. The information processing apparatus according to claim 2,
wherein, in a case where the position corresponding to the second light emission device of the second operation body is within the threshold distance from the position corresponding to the first light emission device of the first operation body and in a case where the first operation body is in the information input state and the second operation body is not in the information input state, the circuitry is further configured to:
control the first light emission device of the first operation body to turn on; and
control the second light emission device of the second operation body to turn off.

6. The information processing apparatus according to claim 2,
wherein, in a case where the position corresponding to the second light emission device of the second operation body is within the threshold distance from the position corresponding to the first light emission device of the first operation body and in a case where the first operation body is not in the information input state and the second operation body is in the information input state, the circuitry is further configured to:
control the first light emission device of the first operation body to turn off; and
control the second light emission device of the second operation body to turn on.

7. The information processing apparatus according to claim 2,
wherein, in a case where the position corresponding to the second light emission device of the second operation body is within the threshold distance from the position corresponding to the first light emission device of the first operation body and in a case where the first operation body and the second operation body are both not in the information input state, the circuitry is further configured to:
control the first light emission device of the first operation body to blink at the first timing; and
control the second light emission device of the second operation body to blink at the second timing.

8. The information processing apparatus according to claim 3, wherein
each light emission device of the first plurality of light emission devices corresponds to a respective operation body of the first plurality of operation bodies, and
the circuitry is further configured to control a ratio of a turn-on time of each light emission device of the first plurality of light emission devices within the specific time based on content of a task executed by the respective operation body.

9. The information processing apparatus according to claim 2,
wherein, in a case where the position according to the second light emission device of the second operation body approaches within the threshold distance, the circuitry is further configured to control display of information that prompts separation of the first operation body.

10. The information processing apparatus according to claim 2, wherein the circuitry is further configured to set the threshold distance based on at least one of a moving speed or a moving direction of the first operation body.

11. The information processing apparatus according to claim 2,
wherein, in a case where positions corresponding to the first plurality of light emission devices approach positions corresponding to a second plurality of light emission devices of a second plurality of operation bodies within the threshold distance and in a case where the positions corresponding to the second plurality of light emission devices of the second plurality of operation bodies includes a position separated farther than the threshold distance, the circuitry is further configured to control
a set of light emission devices, from the first plurality of light emission devices and the second plurality of light emission devices, to blink at timings different from each other, wherein
the second plurality of operation bodies is different from the first plurality of operation bodies,
the set of light emission devices includes a third light emission device and a fourth light emission device, and
the third light emission device approaches the fourth light emission device within the threshold distance.

12. The information processing apparatus according to claim 2,
wherein, in a case where positions corresponding to the first plurality of light emission devices approach positions corresponding to a second plurality of light emission devices of a second plurality of operation bodies within the threshold distance and in a case where the positions corresponding to the second plurality of light emission devices of the second plurality of operation bodies includes a position separated farther than the threshold distance, the circuitry is further configured to control
at least a set of light emission devices from the first plurality of light emission devices and the second plurality of light emission devices to blink at different timings, wherein
the set of light emission devices is related to the positions corresponding to the first plurality of light emission devices and the positions corresponding to the second plurality of light emission devices within the threshold distance, and
the first plurality of operation bodies is different from the second plurality of operation bodies.

13. An information processing method, comprising:
controlling a plurality of light emission devices of a plurality of operation bodies to turn on, wherein
the plurality of operation bodies is communicably coupled to an information processing apparatus, and
the plurality of light emission devices includes:
a first light emission device of a first operation body of the plurality of operation bodies, and
a second light emission device of a second operation body of the plurality of operation bodies;
controlling, in a case where the second light emission device approaches the first light emission device, each of the first light emission device to blink at a first timing and the second light emission device to blink at a second timing, wherein
the second timing is different from the first timing;
detecting each of:
a position corresponding to the first light emission device, of the first operation body, in association with the first operation body, and
a position corresponding to the second light emission device in association with the second operation body; and
displaying information associated with the first operation body at the position corresponding to the first light emission device in a case where the first operation body is in an information input state.

14. A non-transitory computer-readable medium having stored thereon, computer-executable instructions which, when executed by a processor, cause the processor to execute operations, the operations comprising:
   controlling a plurality of light emission devices of a plurality of operation bodies to turn on, wherein
     the plurality of operation bodies is communicably coupled to an information processing apparatus, and
     the plurality of light emission devices includes:
       a first light emission device of a first operation body of the plurality of operation bodies, and
       a second light emission device of a second operation body of the plurality of operation bodies;
   controlling, in a case where the second light emission device approaches the first light emission device, each of the first light emission device to blink at a first timing and the second light emission device to blink at a second timing, wherein
     the second timing is different from the first timing;
   detecting each of:
     a position corresponding to the first light emission device, of the first operation body, in association with the first operation body, and
     a position corresponding to the second light emission device in association with the second operation body; and
   displaying information associated with the first operation body at the position corresponding to the first light emission device in a case where the first operation body is in an information input state.

15. An information processing apparatus, comprising:
circuitry configured to:
   control a plurality of light emission devices of a plurality of operation bodies to turn on, wherein
     the information processing apparatus is communicably coupled to the plurality of operation bodies, and
     the plurality of light emission devices includes:
       a first light emission device of a first operation body of the plurality of operation bodies, and
       a second light emission device of a second operation body of the plurality of operation bodies;
   detect each of:
     a position corresponding to the first light emission device of the first operation body, in association with the first operation body, and
     a position corresponding to the second light emission device in association with the second operation body;
   determine, in a case where the position corresponding to the first light emission device approaches the position corresponding to the second light emission device within a threshold distance, that the first operation body approaches the second operation body and the second operation body approaches the first operation body;
   control, in the case where the position corresponding to the second light emission device is within the threshold distance from the position corresponding to the second light emission device and in a case where the first operation body is in an information input state and the second operation body is not in the information input state, the first light emission device of the first operation body to turn on and the second light emission device of the second operation body to turn off; and
   display, based on the turn on of the first light emission device, information associated with the first operation body at the position corresponding to the first light emission device in a case where the first operation body is in the information input state.

16. An information processing apparatus, comprising:
circuitry configured to:
   control a plurality of light emission devices of a plurality of operation bodies to turn on, wherein
     the information processing apparatus is communicably coupled to the plurality of operation bodies, and
     the plurality of light emission devices includes:
       a first light emission device of a first operation body of the plurality of operation bodies, and
       a second light emission device of a second operation body of the plurality of operation bodies;
   detect each of:
     a position corresponding to the first light emission device of the first operation body, in association with the first operation body, and
     a position corresponding to the second light emission device in association with the second operation body;
   set a threshold distance based on at least one of a moving speed or a moving direction of the first operation body;
   determine, in a case where the position corresponding to the first light emission device approaches the position corresponding to the second light emission device within the threshold distance, that the first operation body approaches the second operation body and the second operation body approaches the first operation body;
   control, in a case where the second light emission device approaches the first light emission device, each of the first light emission device to blink at a first timing and the second light emission device to blink at a second timing, wherein
     the second timing is different from the first timing, and
     each of the first light emission device and the second light emission device is controlled based on the determination that the first operation body approaches the second operation body and the second operation body approaches the first operation body; and
   display information associated with the first operation body at the position corresponding to the first light emission device in a case where the first operation body is in an information input state.

\* \* \* \* \*